May 20, 1952   J. J. GREVICH   2,597,634
COMBINED HEAT SEALING APPARATUS, CODE PRINTER, AND PUNCH
Filed Dec. 4, 1950   11 Sheets-Sheet 1
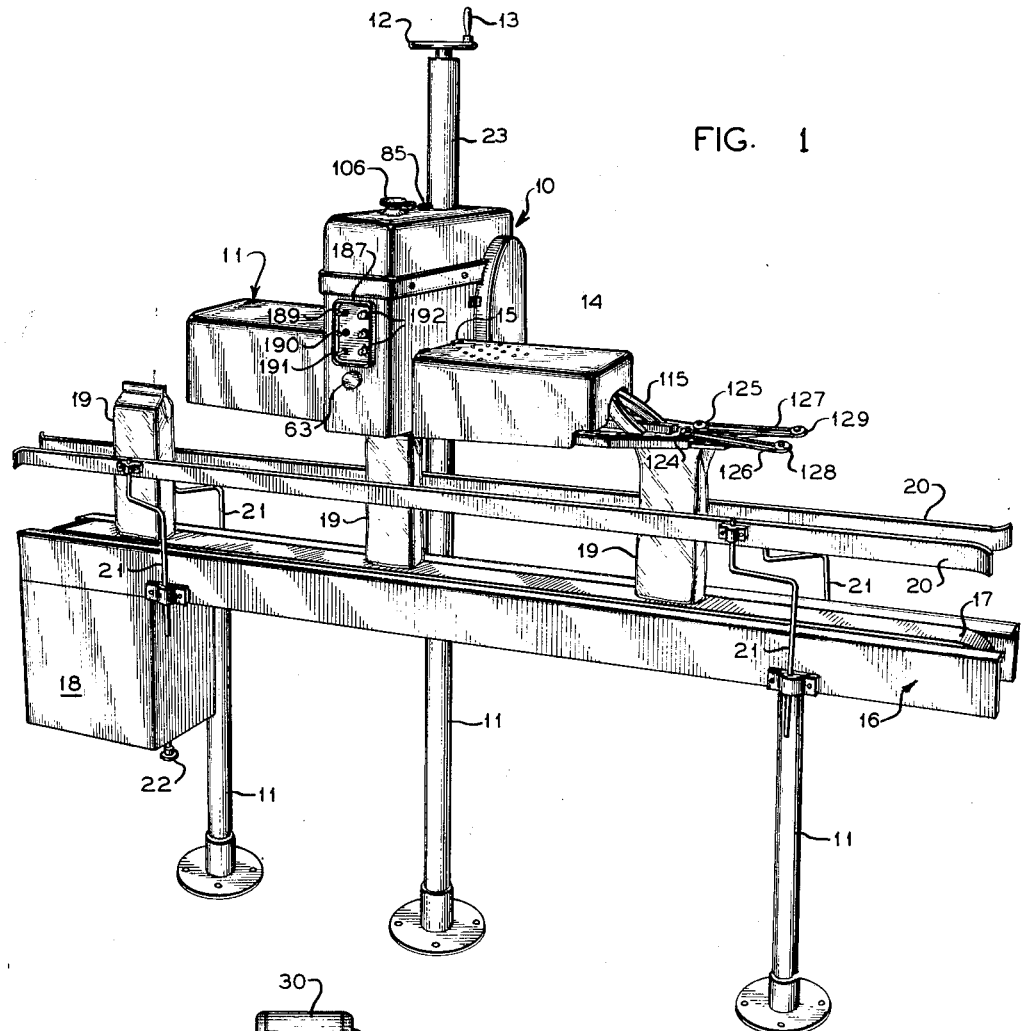
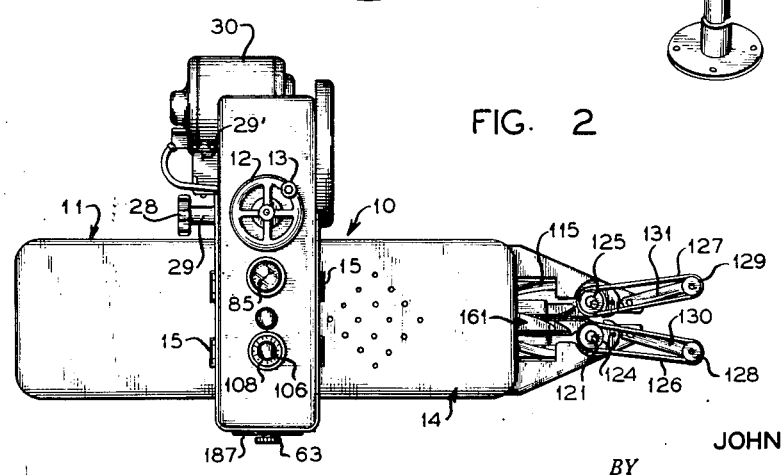
INVENTOR.
JOHN J. GREVICH
BY
A. Yates Dowell
ATTORNEY

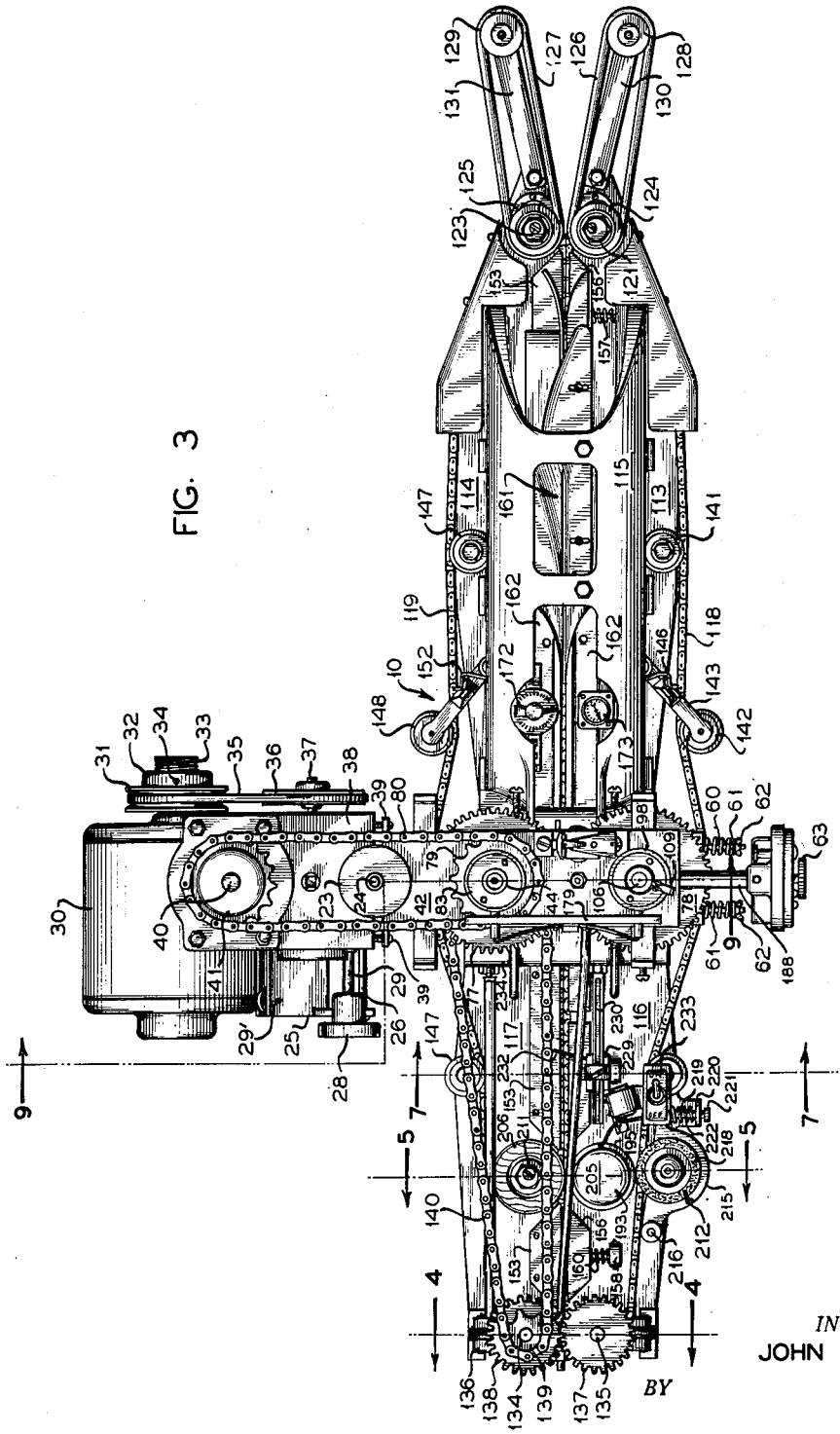

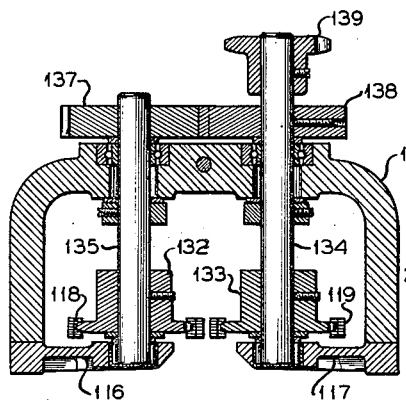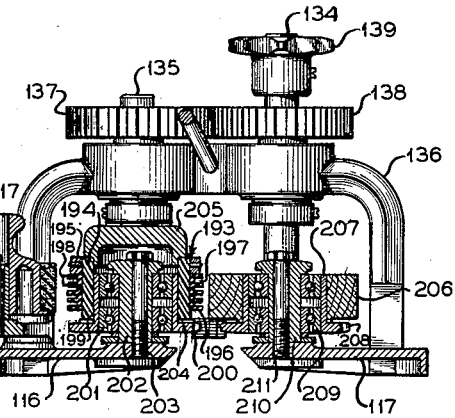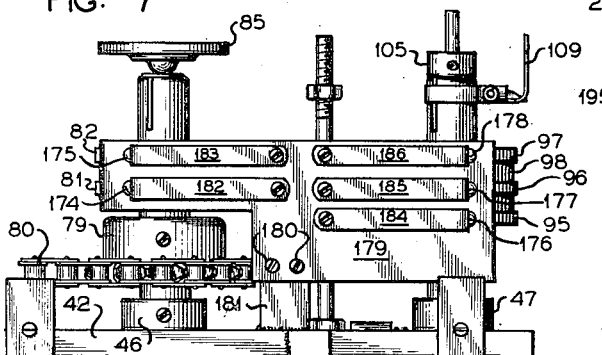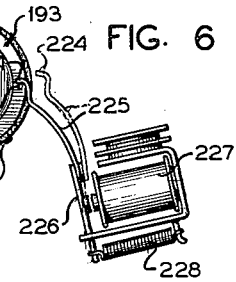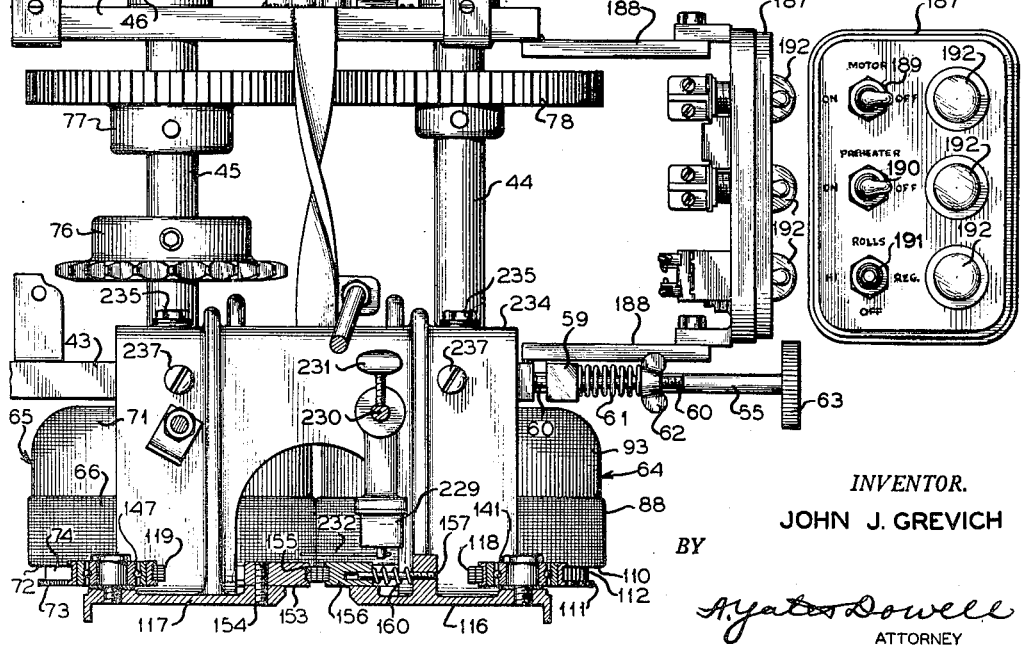

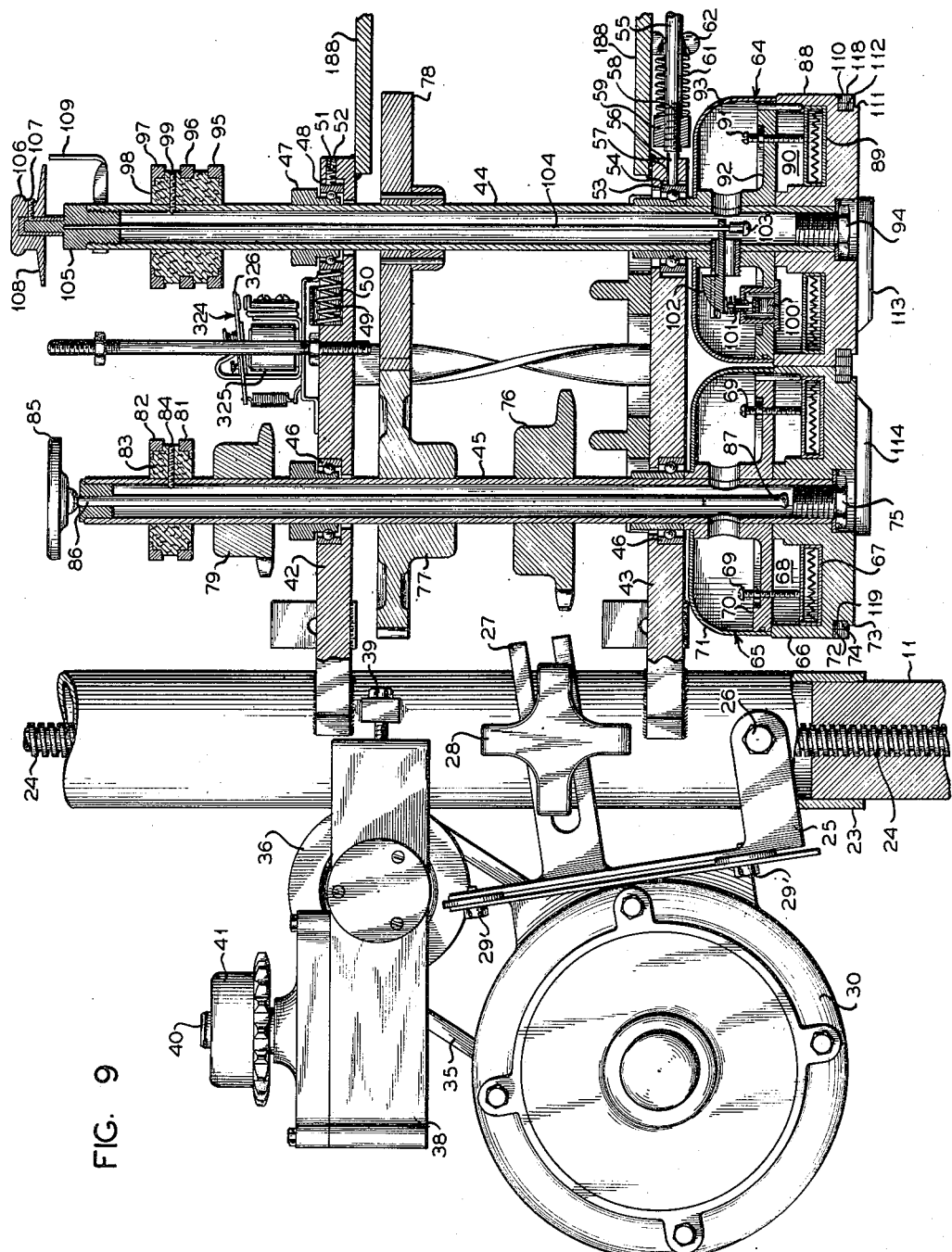

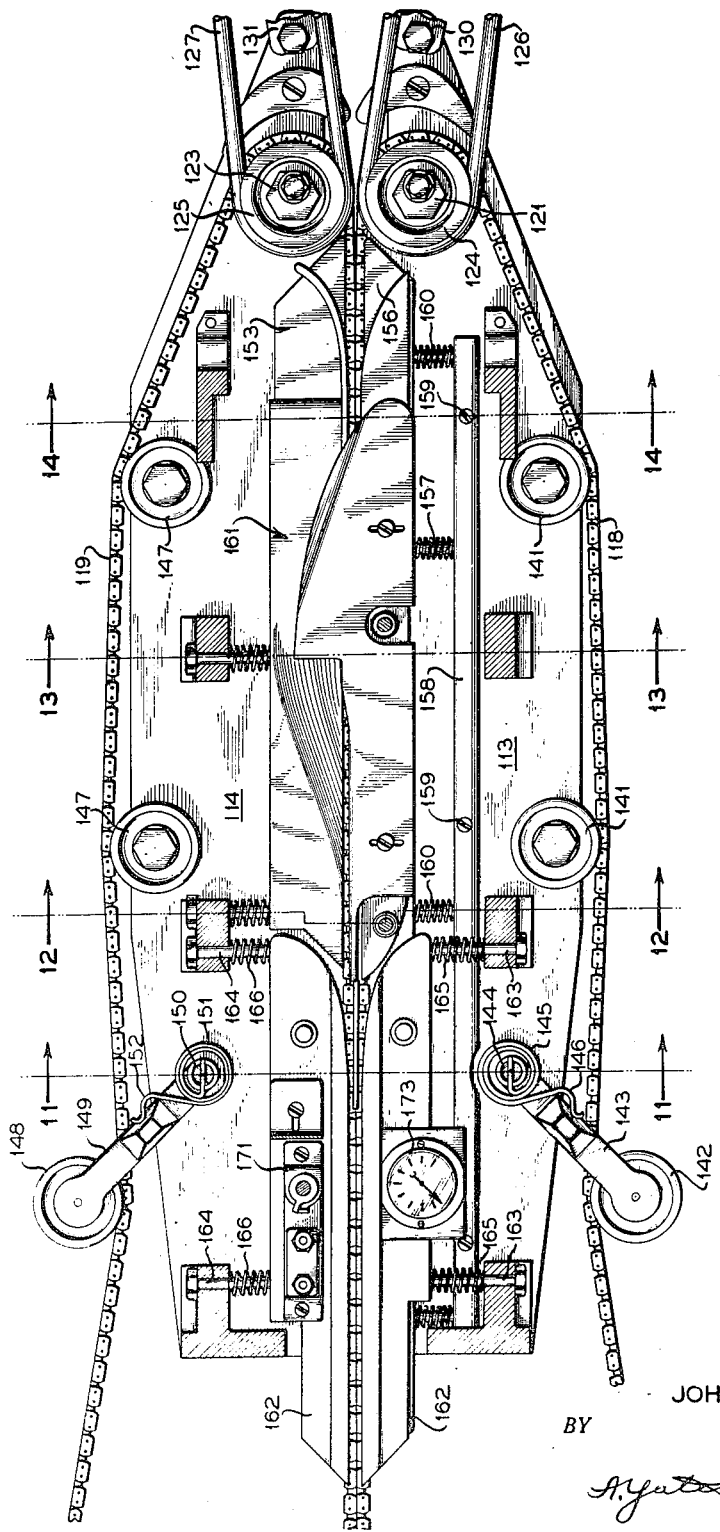

May 20, 1952 J. J. GREVICH 2,597,634
COMBINED HEAT SEALING APPARATUS, CODE PRINTER, AND PUNCH
Filed Dec. 4, 1950 11 Sheets-Sheet 6

INVENTOR.
JOHN J. GREVICH
BY
*A. Yates Dowell*
ATTORNEY

INVENTOR.
JOHN J. GREVICH

May 20, 1952     J. J. GREVICH     2,597,634
COMBINED HEAT SEALING APPARATUS, CODE PRINTER, AND PUNCH
Filed Dec. 4, 1950     11 Sheets-Sheet 8

INVENTOR.
JOHN J. GREVICH
BY
*A. Yates Dowell*
ATTORNEY

May 20, 1952 J. J. GREVICH 2,597,634
COMBINED HEAT SEALING APPARATUS, CODE PRINTER, AND PUNCH
Filed Dec. 4, 1950 11 Sheets-Sheet 9

INVENTOR.
JOHN J. GREVICH
BY
A. Yates Dowell
ATTORNEY

May 20, 1952     J. J. GREVICH     2,597,634
COMBINED HEAT SEALING APPARATUS, CODE PRINTER, AND PUNCH
Filed Dec. 4, 1950     11 Sheets-Sheet 10
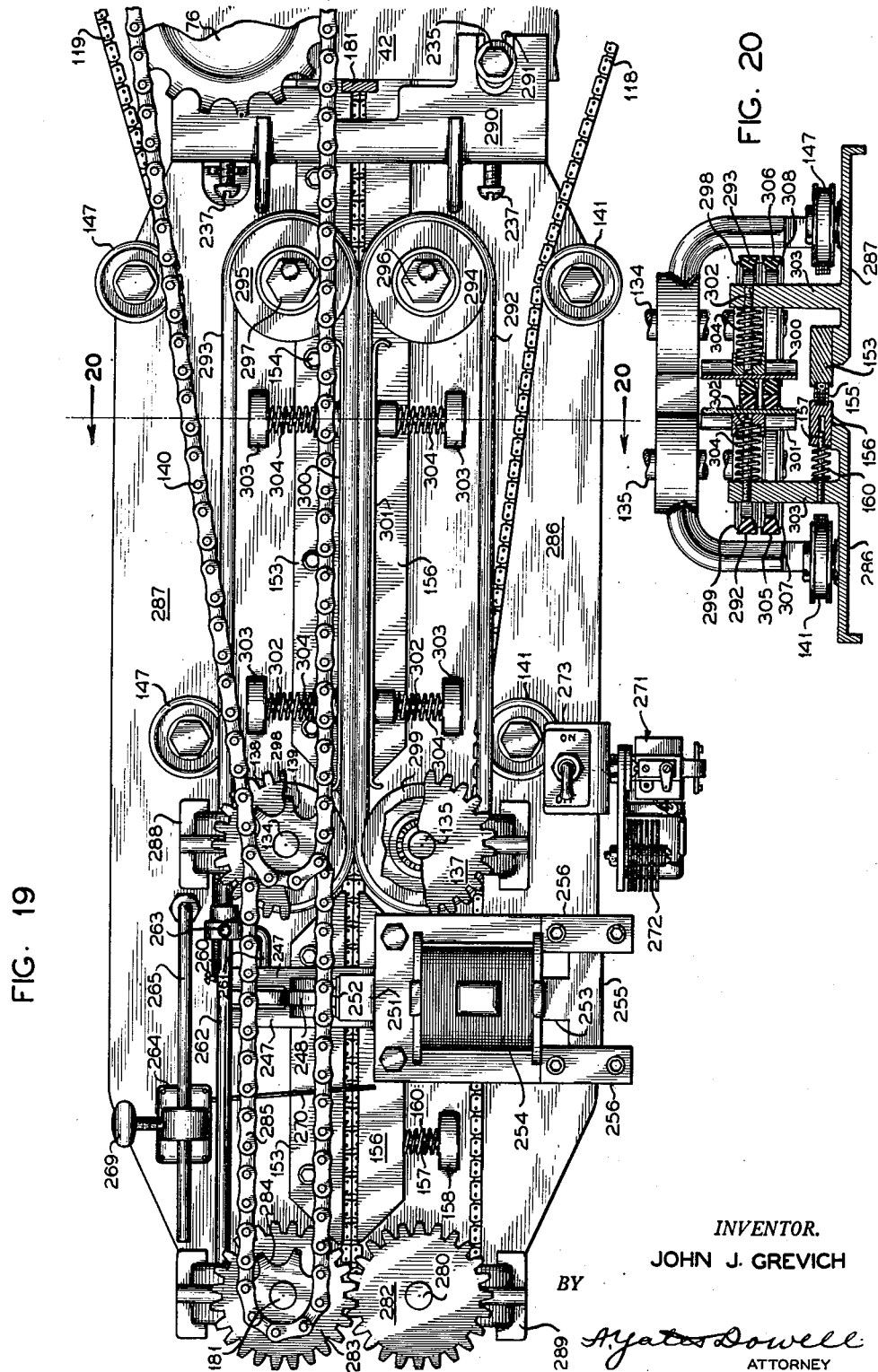
*INVENTOR.*
JOHN J. GREVICH
BY
*ATTORNEY*

May 20, 1952 J. J. GREVICH 2,597,634
COMBINED HEAT SEALING APPARATUS, CODE PRINTER, AND PUNCH
Filed Dec. 4, 1950 11 Sheets-Sheet 11

INVENTOR.
JOHN J. GREVICH
BY
A. Yates Dowell
ATTORNEY

Patented May 20, 1952

2,597,634

UNITED STATES PATENT OFFICE 2,597,634

COMBINED HEAT SEALING APPARATUS, CODE PRINTER, AND PUNCH

John J. Grevich, St. Paul, Minn., assignor, by mesne assignments, to Harris Trust and Savings Bank and W. H. Milsted, as trustees Application December 4, 1950, Serial No. 199,009

36 Claims. (Cl. 154—42)

This invention relates to thermoplastics and more particularly to an apparatus for sealing the open ends of containers formed of a thermoplastic material, applying a coded dating stamp to such containers and, if desired, punching a hole in the sealed portion of the container in order to provide a convenient supporting means therefor.

Heretofore many sealing machines of this type have been developed and utilized but attempts to combine therewith printing means and punching means or either of these have resulted in complicated cumbersome devices which have been relatively expensive to manufacture and which have been subject to frequent breakdowns necessitating frequent stoppages in order to properly repair the same, thereby contributing to unnecessarily high production costs.

Briefly stated, the apparatus of this invention comprises a heat-sealing machine of the rotary type which utilizes heated rolls to seal the openings of containers constructed of thermoplastic material. There is also provided a feeding means for conveying the containers through the sealing rolls and for insuring that there is no relative movement between the containers and such rolls which would tend to result in an improper seal and damaged containers. Since with some types and thicknesses of material the mere contact between the sealing rolls and the material is not sufficient to produce an efficient seal, preheating means in the form of elongated heated bars is provided which serves to preheat the material prior to contact with the sealing rolls. Automatic temperature control means is provided both for the preheating means and for the sealing rolls.

Immediately after the sealing rolls there is provided a printing means which is adapted to apply a coded dating stamp to the sealed portion of the container and this means is entirely automatic in operation being actuated by contact of the containers with switch means which sets the printing apparatus in operation and which results in operation of this apparatus through a predetermined fixed cycle.

Where it is desired to provide an aperture in the sealed portion of the container in order to facilitate supporting the same on a display rack or the like, a punch means is provided in the machine directly after the dating apparatus. This punching means is electrically operated and is controlled by contact of the containers with a switch which actuates the punching means to provide a cleanly punched hole in the sealed portion of the container. Means is also provided to permit punching of these holes during movement of the container and without tearing or mutilation of the same.

With some types of materials it is necessary to retain the sealed portions in tight pressure contact for a period after passing through the sealing rolls and for accommodating this type of material means may be provided in the apparatus of this invention to hold these sealed edges in contact and to cool the same, thus resulting in a firm, efficient seal.

The invention further contemplates complete and efficient one-man operation, automatic control of temperatures and manual control of speeds in order to properly synchronize the sealing operations with the types of material being utilized. Also, the apparatus is adjustable as to height in order to accommodate different sizes of containers passing therebeneath and preferably conveyed by a belt situated on a table positioned immediately beneath and adjacent the sealing apparatus.

It is accordingly an object of this invention to provide a heat-sealing apparatus of the rotary type in which means is provided to feed containers formed of thermoplastic material between sealing rolls and to insure that the speed of travel of the containers is synchronized with the speed of rotation of the sealing rolls.

It is a further object of the invention to provide sealing means combined with printing means and in which the printing means is automatically controlled by contact of a control means with the containers passing through the sealing machine.

It is a further object of the invention to provided a sealing apparatus combined with a punching means for providing an aperture in the sealed portion of the container and in which actuation of the punching means is controlled by movement of the containers through the sealing apparatus.

It is a further object of the invention to provide a heat-sealing apparatus in which means is included for preheating the openings of the containers prior to contact with the sealing rolls in order to effect a firm and efficient seal.

It is a further object of the invention to provide a heat-sealing apparatus in which means is provided for retaining the sealed portions of the container in tight pressure contact for a predetermined period subsequent to contact with the heated sealing rolls.

It is a further and important object of the invention to provide a heat-sealing apparatus which is relatively simple and economical to manufacture and which may be operated at a relatively high speed without danger of clogging or breakage and in which the sealing operations are synchronized with printing and punching of an aperture in the sealed portion of the container.

Further objects and advantages of the invention will be apparent from the following description taken in conjunction with the accompanying drawings, wherein:

Fig. 1 is a perspective view showing the sealing apparatus of this invention installed in conjunction with a feeding means and the manner of feeding containers to and from the sealing apparatus;

Fig. 2, is a top plan view of the sealing apparatus of this invention;

Figure 11:
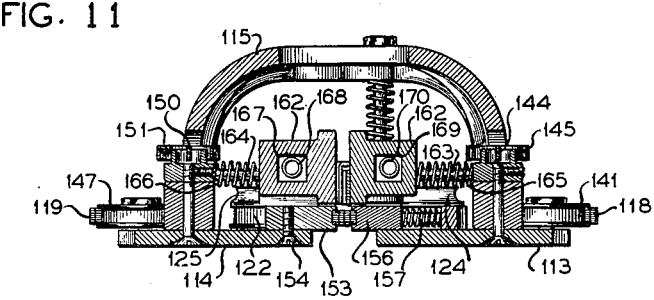
Figure 12:
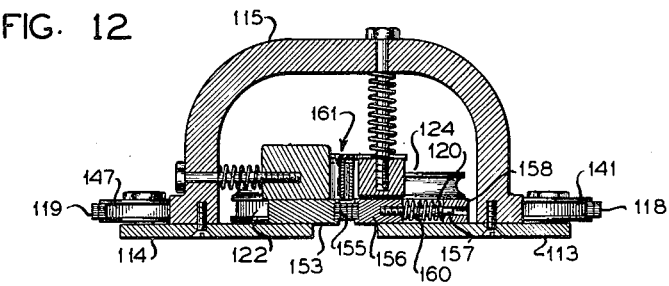
Figure 13:
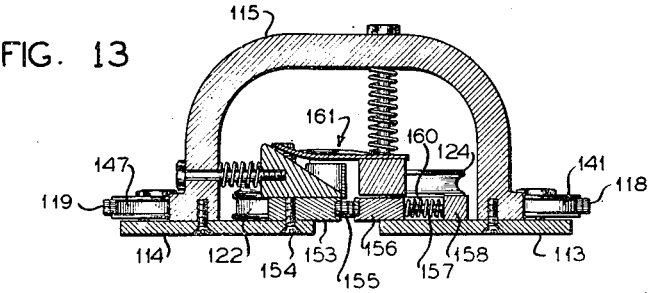
Figure 14:
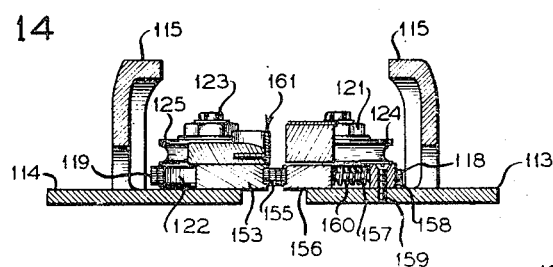
Figure 15:
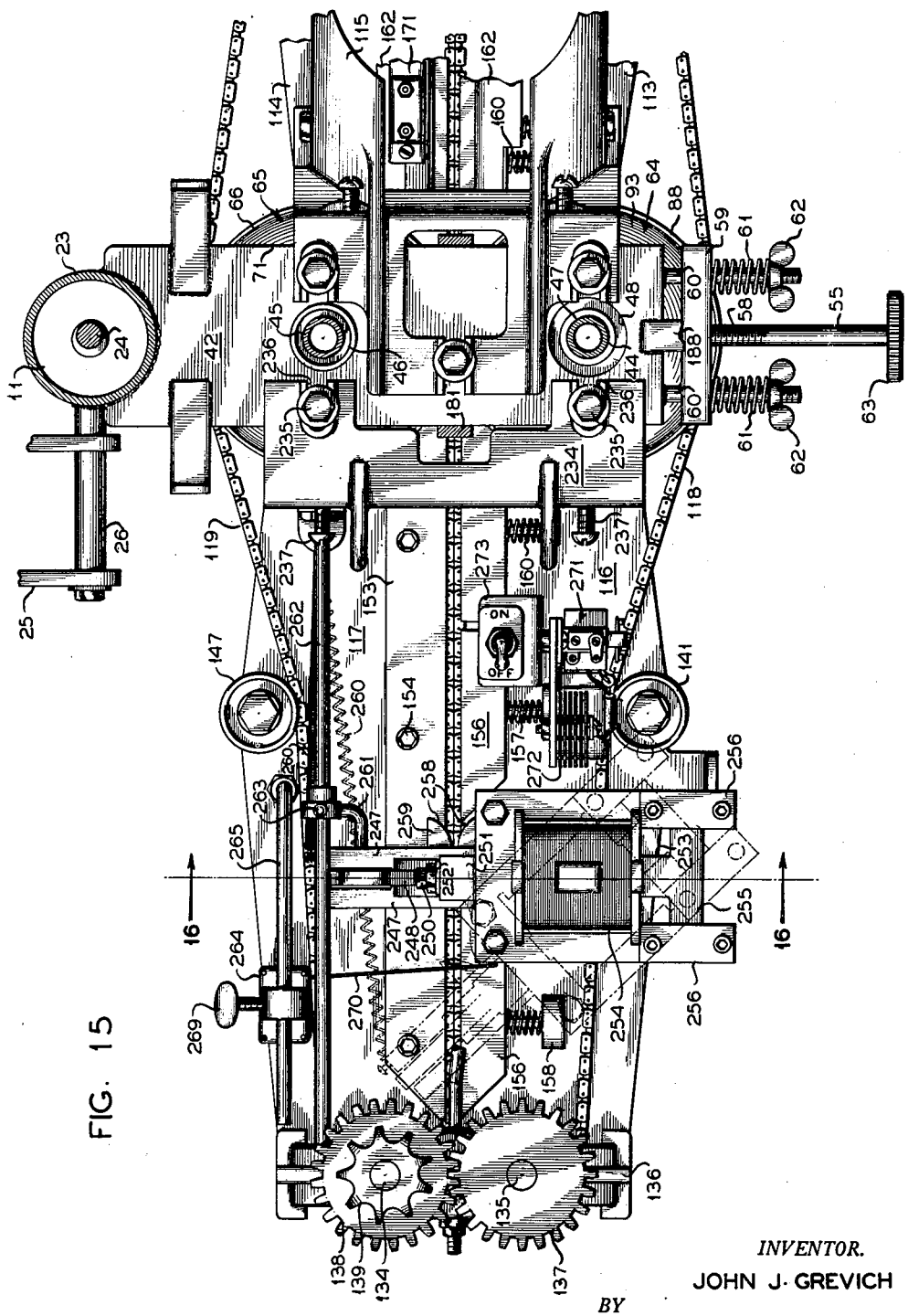
Figure 16:
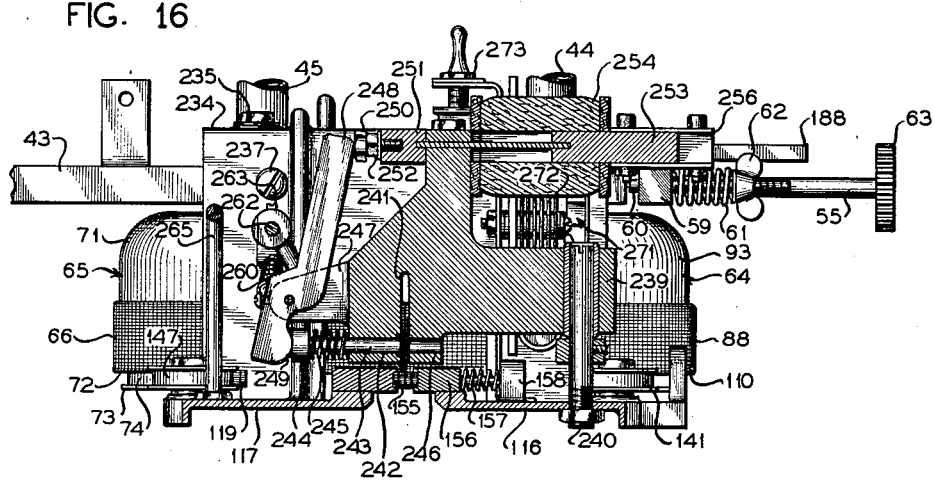
Figure 17:
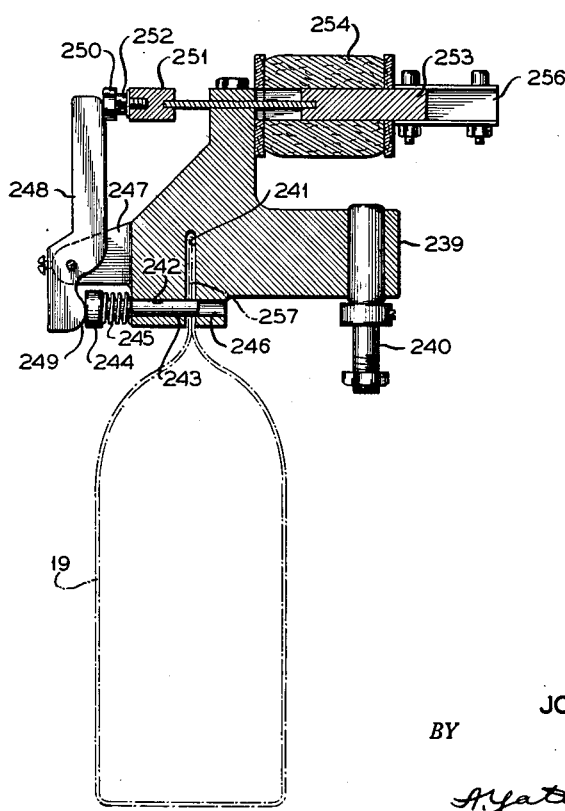
Figure 18:
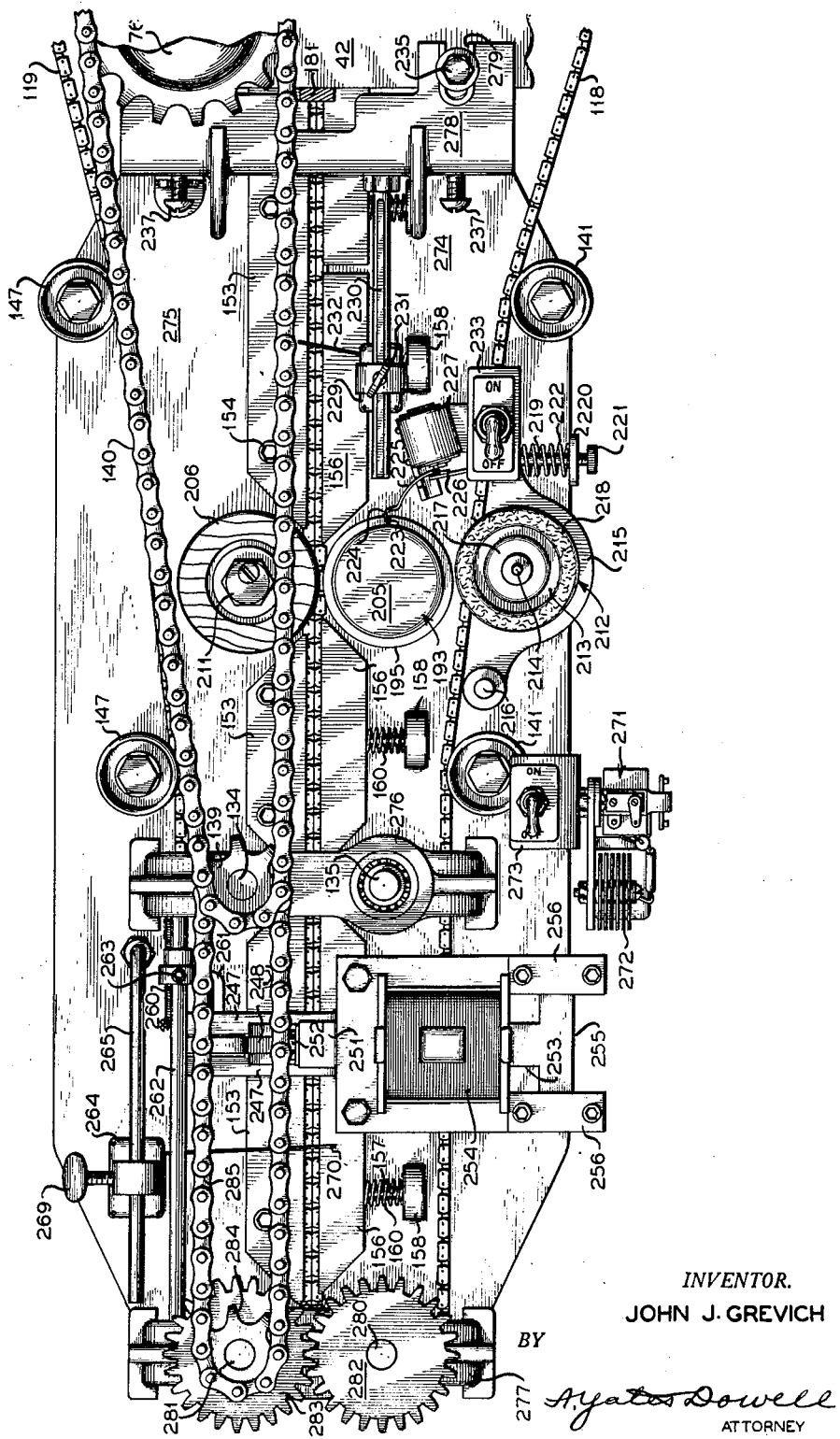
Figure 21:
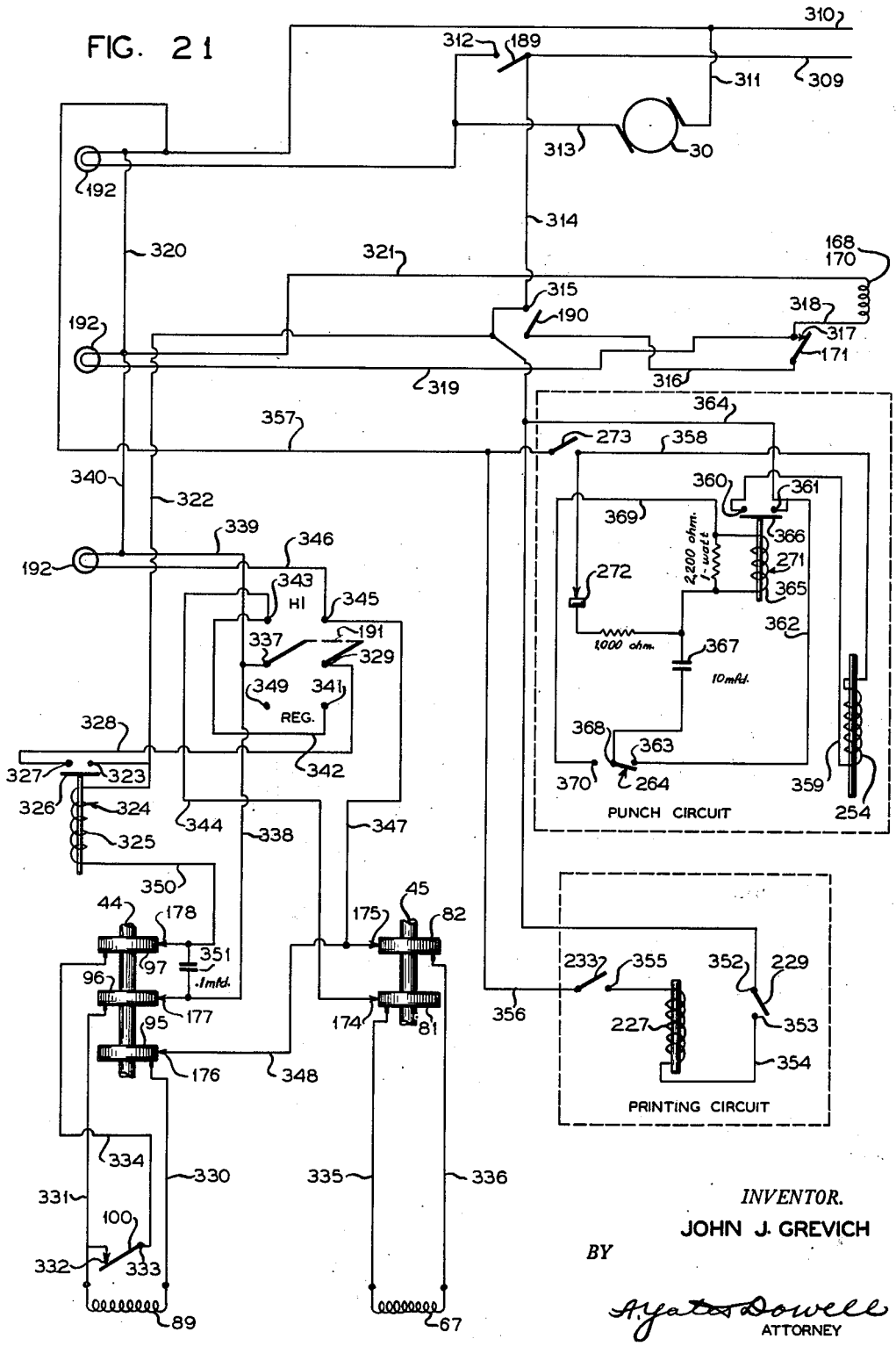

Fig. 3, a top plan view of the sealing apparatus of this invention with the housings removed in order to afford a clear view of the mechanism involved;

Fig. 4, a sectional view on the line 4—4 of Fig. 3;

Fig. 5, a sectional view on the line 5—5 of Fig. 3 and showing the printing mechanism utilized in conjunction with the sealing apparatus of this invention;

Fig. 6, a fragmentary detailed plan view showing the solenoid control means for the printing apparatus of this invention;

Fig. 7, a fragmentary sectional view on the line 7—7 of Fig. 3 with parts in elevation for greater clarity and showing the arrangement of the sealing rolls and drive means therefor together with the means for retaining the sealing rolls in pressure engagement;

Fig. 8, an elevational view showing the control panel of the apparatus of this invention;

Fig. 9, a fragmentary sectional view on the line 9—9 of Fig. 3 and showing the internal construction of the sealing rolls, the shafts supporting the same and the installation of the drive motor and reduction gear for driving the sealing rolls and feeding apparatus;

Fig. 10, a fragmentary plan view with parts in section for greater clarity and showing the feeding mechanism at the entrance side of the apparatus together with the folding means for the containers to be sealed as well as the preheating mechanism for heating the mouth portions of the containers prior to contact with the sealing rolls;

Fig. 11, a sectional view on the line 11—11 of Fig. 10 and showing the internal construction of the preheating means and its relationship to the feeding means;

Fig. 12, a sectional view on the line 12—12 of Fig. 10 and showing one portion of the folding means;

Fig. 13, a sectional view on the line 13—13 of Fig. 10 and showing another portion of the folding means;

Fig. 14, a sectional view on the line 14—14 of Fig. 10 and showing the entrance to the folding means and the relationship of the feeding means thereto;

Fig. 15, a fragmentary top plan view showing a punching means combined with the sealing apparatus of this invention and further showing the relationship between the punching means and the sealing rolls;

Fig. 16, a fragmentary sectional view on the line 16—16 of Fig. 15 and showing the internal construction of the punching means;

Fig. 17, a fragmentary sectional view similar to Fig. 16 and showing the manner in which an aperture is punched in the sealed portion of a container;

Fig. 18, a fragmentary top plan view showing a printing means and a punching means combined with the sealing apparatus of this invention;

Fig. 19, a fragmentary top plan view similar to Fig. 18 and showing a punching means and a pressure means for retaining the sealed portions of the container in contact after uniting by the sealing rolls;

Fig. 20, a sectional view on the line 20—20 of Fig. 19 and showing the means for retaining the sealed portions of the container in contact; and Fig. 21, a circuit diagram of the electrical circuit of the apparatus of this invention.

With continued reference to the drawings there is shown in Fig. 1 a heat-sealing apparatus constructed in accordance with this invention, this apparatus 10 being mounted on a pedestal or standard 11 which may be secured in place on the floor of the building in which the apparatus is to be operated, the height of the sealing mechanism 10 above the floor being conveniently controlled by a hand-wheel 12 provided with a crank 13 which may be conveniently engaged by the hand of the operator. The specific mechanism for accomplishing the height adjustment of the sealing mechanism will be later described. The sealing apparatus 10 may also be provided with housings 14 secured to the apparatus by hinges 15 to permit convenient movement of the housings when it is necessary to make adjustments and in case it is necessary to make extensive repairs, the complete housing may be removed in order to afford convenient access to the apparatus.

One typical operation utilizing the heat-sealing apparatus 10 of this invention is shown in Fig. 1, in which a table 16 provided with a conveyor belt 17 driven by mechanism enclosed in a housing 18 at one end thereof serves to feed containers 19 formed of thermoplastic material to the sealing apparatus and to convey the sealed containers therefrom. In order to prevent displacement of the containers 19 prior to engagement with the feeding means incorporated in the sealing apparatus 10 there may be provided guide rails 20 adjustably supported on rods 21 whereby different sized containers 19 may be accommodated, the rails 20 being adjustable both as to height and spacing in order to take care of such containers. The speed of travel of the conveyor belt 17 may be conveniently controlled by a finger-engaging knob 22 projecting from the housing 18 which contains the conveyor drive means.

Referring to Fig. 9, there is shown the upper portion of the pedestal or supporting column 11 and telescopically received over this column is a sleeve 23 which serves to support the sealing apparatus. Threadedly received in the upper portion of the column 11 is an elongated threaded rod 24 upon the upper end of which is mounted the control or hand-wheel 12. Hand-wheel 12 is secured against axial movement in the sleeve 23, and, consequently, rotation thereof in either direction will serve to turn the threaded rod 24 in the threaded portion of the column 11 and thus move the sealing mechanism 10 upwardly or downwardly in accordance with the desired height above the floor.

With continued reference to Fig. 9, there is shown a bracket 25 pivotally mounted at 26 on the sleeve 23, this bracket having a slotted extension 27 engaged by a clamping nut 28 threadedly received on a rod 29 projecting from the sleeve 23, nut 28 serving to clamp the slotted portion 27 and the bracket 25 in adjusted angular position. Carried by the bracket 25 and secured thereto by screw-threaded fastening means or the like 29' is a drive motor 30 which, as best shown in Fig. 3, carries a V-pulley 31 mounted on the drive shaft thereof. The V-pulley 31 is comprised of two parts, the outer part 32 thereof being threadedly received on a portion 33 which forms the hub of the pulley whereby upon rotation of the part 32 upon the hub 33 the distance between the parts of the pulley may be varied to adjust the effective diameter thereof, thus controlling the speed of rotation of the driven mechanism. The parts of the pulley 31 may be locked in adjusted position by a headless set screw or the like 34.

Pulley 31 is connected through a V-belt 35 with a pulley 36 mounted on a shaft 37 which extends into and drives a speed-reducing mechanism 38 mounted on the sleeve 23 by screw-threaded fastening means or the like 39. Speed-reducing mechanism 38 is provided with a power output shaft 40 projecting vertically from the top thereof and mounted on this shaft 40 is a drive sprocket 41.

Vertically spaced parallel frame members 42 and 43 respectively are secured to the sleeve 23 by welding or the like and extend substantially at right angles thereto on the opposite side from the motor 30 and speed-reducing mechanism 38. Extending vertically through the frame members 42 and 43 and supported thereby in spaced parallel relation are front and rear roll-supporting shafts 44 and 45. The rear roll shaft 45 is rotatably carried by frame members 42 and 43 by means of anti-friction bearings 46. The front roll supporting shaft 44 is carried adjacent the upper end in the upper frame member 42 by means of an anti-friction bearing 47 received in an elongated recess 48 in the frame member 42. The rear side of the anti-friction bearing 47 is engaged by a compression spring 49 received in a recess 50 in the frame member 42, spring 49 serving to urge the anti-friction bearing 47 and shaft 44 carried thereby toward the front of the machine. The position of the bearing 47 in recess 48 is controlled by a set screw 51 received in an aperture 52 in the outer end of the upper frame member 42. The operation and purpose of this adjustment by means of the set screw 51 will be later described.

The lower end of front roll shaft 44 is supported by an anti-friction bearing 53 received in an elongated recess 54 in the lower surface of lower frame member 43. Bearing 53 is free to move forwardly or rearwardly in the recess 54 for a purpose to be presently described and bearing 53 and shaft 44 carried thereby is normally urged rearwardly into the recess 54 by a spring loaded adjusting rod 55 having a reduced forward portion 56 slidably received in an aperture 57 in the front end of the frame member 43. Rod 55 has a screw-threaded portion 58 received in a cross bar 59 which in turn is slidably mounted on spaced parallel rods 60 which are fixed in the outer end of frame member 43. Also received on rod 60 are coil compression springs 61 which engage the cross bar 59, springs 61 being also engaged by the wing nuts 62 threadedly received on the rod 60 whereby the compressive force exerted by springs 61 may be adjusted. The rod 55 is provided with a finger-engaging knob 63 to facilitate convenient adjustment thereof and it will be seen that by rotating rod 55 the force exerted on the anti-friction bearings 53 in a rearward direction and which tends to urge the shaft 44 and parts carried thereby in the same direction may be conveniently controlled, the force of this pressure being controlled by the wing nuts 62 bearing on the compression springs 61.

Shafts 44 and 45 serve to support at their lower ends front and rear sealing rolls 64 and 65 respectively. Roll 65 is provided with a serrated sealing surface 66 and a heating element 67 is received in an internal annular recess 68. The heating element 67 is held in position by screw-threaded fastening means or the like 69 extending through a rear plate 70, the complete rear surface of the roll 65 being covered by a housing 71. Roll 65 is provided adjacent its lower end with a shoulder 72 and a spaced annular flange 73 which provides therebetween an annular groove 74 the purpose of which will be later described. The supporting shaft 45 is hollow and the roll 65 is supported thereon by a screw-threaded fastening means or the like 75 in engagement with a threaded portion of such shaft.

Shaft 45 is provided intermediate its length with a sprocket 76, the purpose of which will be later described and also with a spur gear 77 which meshes with a spur gear 78 mounted on shaft 44 to provide synchronized rotation between the two shafts. Also mounted on shaft 45 is a sprocket 79 which serves to receive a chain 80 trained over this sprocket and the drive sprocket 41 on shaft 40 extending from speed-reducing mechanism 38 whereby shafts 45 and 44 are driven from the motor 30. Also mounted on the shaft 45 above the sprocket 79 are slip rings 81 and 82 which are supported by a circular block of insulating material 83 secured and positioned on the shaft 45 by a set screw or the like 84, these slip rings serving to provide electrical energy for the heating elements 67 by means of conductors, not shown, which extend through the hollow shaft 45. Also slip rings 81 and 82 are engaged by brushes, the structure of which will be later described.

In order to provide a visual indication of the temperature of the roll 65 a thermometer 85 is provided with a downwardly extending rod 86 mounted within the hollow shaft 45 there being a temperature responsive element 87 at the lower end of the rod 86 and enclosed within the confines of sealing roll 65, this temperature responsive element 87 indicating on the dial 85 the temperature within roll 65.

The front sealing roll 64 is provided with a serrated sealing surface 88 and a heating element 89 disposed in an annular recess 90 within the roll. The heating element 89 is held in position by screw-threaded fastening means or the like 91 extending through a rear cover plate 92, the upper portion of the roll 64 being covered by a housing 93 in a manner similar to rear roll 65. Shaft 44 is likewise hollow and the roll 64 is secured thereon by screw-threaded fastening means or the like 94. As stated above, shaft 44 is provided with the spur gear 78 which, by meshing with spur gear 77 on shaft 45, serves to drive shaft 44 and roll 64 supported thereby. Secured on shaft 44 above the upper frame member 42 are slip rings 95, 96 and 97 mounted on a cylindrical insulating block 98 which is fixed on the shaft 44 by a set screw or the like 99. Slip rings 95, 96, and 97 serve to provide electrical energy for the heating element 89 and also to provide for convenient and accurate control of the temperature of the heating rolls.

The electrical circuit utilized in supplying the heating elements 67 and 89 and controlling the temperature thereof will be later described, but the means for controlling this temperature comprises a thermostat 100 mounted in the rear cover plate 92 of roll 64, this thermostat having an actuating or control pin 101 projecting therefrom, which pin is engaged by a rocker arm 102 projecting from the interior of hollow shaft 44. The inner end of rocker arm 102 is engaged by the head 103 of an elongated rod 104 projecting through the interior of shaft 44 to the upper end thereof, rod 104 being fixed to a screw-threaded plug 105 threadedly engaged with the other end of shaft 44. Plug 105 carries a finger-engaging knob 106 fixed thereto by a set screw or the like 107, there being an indicating dial 108 and an index pointer 109 which is fixed to the shaft 44 in order to indicate the setting of the thermostat 100. Rotation of the knob 106 will rotate the plug 105 and move the same inwardly or outwardly of the shaft 44 thus moving the rod 104 axially and pivoting the rocker arm 102 to move the pin 101 inwardly or outwardly of the thermostat 100 and thus control the point at which the contact points of the thermostat 100 will open or close. It will therefore be obvious that by proper connection of the thermostat 100 and heating elements 67 and 89 together with a source of electrical energy that it will be possible to accurately and conveniently control the temperature within the sealing rolls 64 and 65, this temperature being indicated by the thermometer dial 85. Likewise front sealing roll 64 is provided with a shoulder 110 and an annular flange 111 forming between them an annular groove 112 complementary to the annular groove 74 in rear sealing roll 65 and the purpose of these grooves will be presently described.

Referring particularly to Figs. 3 and 10, a pair of spaced parallel elongated flat bars 113 and 114 are supported by an elongated yoke 115 which in turn is secured to the lower frame member 43 projecting from sleeve 23. Bars 113 and 114 serve to support the feeding mechanism, folding mechanism and the preheater, the details of which will be later described.

Also secured to the lower frame member 43 at the opposite side of the machine are spaced parallel flat bars 116 and 117 which serve to support the feeding means for delivering sealed containers from the apparatus and also the drive means for such feeding means. Likewise, as shown in Fig. 3, bars 116 and 117 serve to support the means for printing information on the sealed containers. Details of this printing mechanism will be later described. The feeding mechanism for conveying containers to and from the sealing rolls 64 and 65 comprises front and rear chains 118 and 119 respectively. Front chain 118 is trained around a pulley 120 rotatably mounted on an eccentric stud 121 at the outer end of the bar 113 while the corresponding end of the rear chain 119 is trained over the pulley 122 mounted on an eccentric stud 123 secured to the rear bar 114. Studs 121 and 123 also serve to rotatably carry pulleys 124 and 125 which receive flexible elastic belts 126 and 127 respectively, the opposite ends of these belts being trained over pulleys 128 and 129 respectively which are mounted on the outer ends of bars 130 and 131 pivotally secured to bars 113 and 114. Belts 126 and 127 diverge slightly and provide a convenient entrance for the open mouth portions of the containers to be sealed, these belts serving to feed such containers between the conveying chains 118 and 119.

The opposite ends of chains 118 and 119 are trained over sprockets 132 and 133 which are mounted on vertically disposed shafts 134 and 135 which, as shown in Fig. 4, are journaled for rotation in bars 116 and 117 and in a yoke 136 which is secured to such bars. Shaft 135 is provided at its upper end with a spur gear 137 which meshes with a spur gear 138 secured to shaft 134 there being mounted on shaft 134 above the spur gear 138 a sprocket 139. Sprocket 139 is driven by a chain 140 engaging sprocket 76 mounted on rear roll shaft 45.

The outer run of chain 118 is trained over idler pulleys 141 and a chain tightening pulley 142 which, as best shown in Fig. 10, is carried by an arm 143 pivotally mounted at 144 on bar 113. A helical spring 145 is secured at one end to the pivot 144 with its opposite end 146 bearing against the bar 143 to urge the pulley 142 against chain 118 and thus maintain the proper tension therein. Chain 118 is adjusted as to length by movement of the eccentric stud 121 carrying pulley 120.

In a like manner the outer run of rear chain 119 is trained over idler pulleys 147 rotatably mounted on the bar 114 and over chain-tightening pulley 148 carried by an arm 149 pivotally mounted at 150 on the bar 114. Likewise, secured to the pivot 150 is a helical spring 151 the opposite end of which 152 bears against the bar 149 to impart the proper tension to the chain 119. The length of chain 119 is adjusted by eccentric stud 123 for the pulley 122.

As best shown in Figs. 3, 10 and 11 to 14, the inner runs of chains 118 and 119 are in abutting relationship and serve to receive the containers therebetween to convey the same through the machine. These chains are held in engagement with each other by guide shoes mounted on the bars 113, 114, 116 and 117. As shown in Figs. 11 to 14, the guide shoes 153 for the rear chain 119 are secured to the bars 114 and 117 by screw-threaded fastening means or the like 154. These guide shoes 153 are of relatively short length and are spaced throughout the length of the machine in order to provide a sufficient area or bearing to keep the chains in engagement throughout substantially the length thereof of the inner runs. The shoes 153 are provided with longitudinal grooves 155 on the inner face thereof which serve to receive the chain and prevent displacement.

The inner run of the front chain 118 is held in engagement with the rear chain 119 by shoes 156 which are slidably supported on the bars 113 and 116 by pins 157 carried by blocks 158 which are secured to the bars 113 and 116 by screw-threaded fastening means or the like 159. Shoes 156 are urged inwardly toward the chain 118 by compression springs 160 received on the rods 157. The chains 118 and 119 are held in engagement adjacent the point of tangency of the front and rear sealing rolls 64 and 65 by engaging in the annular grooves 74 and 112. Likewise, the outer runs of chains 118 and 119 engage in these grooves when passing the rolls, as best shown in Fig. 3.

Since the containers with which this invention is utilized are made of relatively thin material and since it is highly desirable that the sealed portion have relatively great physical strength it has been found advantageous to fold the mouth of the container prior to sealing thereof and for this purpose there is provided adjacent the entrance end of the machine a folding mechanism 161. This mechanism is entirely conventional and since the same forms no part of this invention, a detailed description thereof is considered unnecessary. A consideration of Figs. 10 to 14 will illustrate the manner of operation of this folding mechanism.

With some types of material it is necessary to preheat the same prior to contact with the sealing rolls in order to obtain an efficiently sealed joint and for this reason there is provided preheating means to heat the folded portions of the containers in order that they may be efficiently sealed by the sealing rolls. This preheating means comprises front and rear heating shoes 162 which, as best shown in Figs. 10 and 11, are slidably supported for movement toward and from each other by pins 163 and 164 respectively, slidably received in apertures in portions of yoke 115. Compression springs 165 and 166 respectively are received around the pins 163 and 164 and serve to urge the preheating shoes 162 toward each other.

Received within longitudinal recesses 167 and 169 in shoes 162 are heating elements 168 and 170. These elements serve to provide the necessary heat to the shoes 162 whereby upon engagement with the material of the container the same is heated sufficiently to provide an efficient joint after passing through the sealing rolls. The temperature of the shoes 162 is controlled by a thermostat 171 mounted on one of the shoes 162 and which may be adjusted by a finger-engaging knob 172, the temperature of the shoes being indicated by a thermometer 173 mounted on the other shoe 162. The shoes 162 are of sufficient length to engage the material of the container for the desired length of time with due regard to the speed of travel of the conveying chains 118 and 119.

As stated above, the heating elements 67 and 89 in the rolls 65 and 64, respectively, are supplied with electrical energy through slip rings 81 and 82 mounted on shaft 45 and slip rings 95, 96 and 97 mounted on shaft 44. Slip rings 81 and 82 are supplied with electrical energy by means of brushes 174 and 175 and the slip rings 95, 96 and 97 by means of brushes 176, 177 and 178. All of the brushes are slidably mounted in a plate of insulating material 179 secured by screw-threaded fastening means or the like 180 to a bracket 181 mounted on upper frame member 42. Brushes 174 and 175 are engaged by leaf springs 182 and 183, respectively, which urge these brushes against the slip rings 81 and 82 and serve to supply electrical energy to the brushes and through them to the slip rings. Brushes 176, 177 and 178 are engaged by leaf springs 184, 185 and 186 respectively and perform the same function as the springs and brushes above described.

A control panel 187 is mounted on the front of the machine by brackets 188 extending from the upper and lower frame members 42 and 43. Control panel 187 serves to support a motor switch 189, a preheater switch 190 and a roll heater switch 191, the latter switch having two positions, high and regular. Also provided on the control panel 187 are pilot lights 192 for each switch, these pilot lights indicating when the circuit associated with that switch is energized. The various circuits controlled by the switches as well as the entire electrical circuit of the apparatus will be later described.

The apparatus above described constitutes the basic sealing machine and this machine may be utilized to seal containers of various types of thermoplastic material and as fully explained above will accommodate such containers of widely varying sizes. Likewise, the temperatures involved may be accurately controlled so that efficient seals may be obtained regardless of the type of material and as fully explained above, preheating means is provided in order to impart the desired heat to the container prior to engagement with the sealing rolls. Temperature-indicating means is provided in order that continuous check may be maintained on the temperature of both the preheating means and the sealing rolls in order that adjustments may be made from time to time in order to compensate for changes in material or for changes in the ambient conditions surrounding the machine which tend to affect the temperature and result in improper or imperfect seals. It has likewise been seen that the speed of operation of the machine may be conveniently controlled by adjustment of the drive pulley 31 on the motor 30 and the pressure between the sealing rolls 64 and 65 may be controlled by adjustment of the rod 55 through the medium of the finger-engaging knob 63.

Referring again to Fig. 9, it will be seen that adjustment of the rod 55 to vary the pressure exerted between the rolls 64 and 65 may tend to throw the shaft 44 out of axial alignment and consequently adjustment of the set screw 51 to move the anti-friction bearing 47 in recess 48 may be necessary in order to obtain correct engagement between the spur gears 77 and 78. While minor variations in thickness of the container material take place adjustment of this set screw 51 is not necessary for such reason, it only being necessary to make such adjustment when containers of widely different thicknesses are to be sealed in the machine.

The structure and operation of the mechanism to print the date or other information on the sealed portion of the container will now be described.

As best shown in Figs. 3, 5 and 6, the printing mechanism comprises a printing cylinder 193 which consists of a sleeve 194 having a collar 195 fixed thereto adjacent the upper end. Received about the sleeve 194 is a cylindrical member 196 of rubber or other suitable material, this member 196 being provided with a plurality of annular grooves 197 for receiving type 198. Sleeve 194 is removably received on a sleeve 199 having a sprocket 200 adjacent the lower end thereof. Sleeve 199 is rotatably supported by anti-friction bearings 201 on an eccentric bushing 202 which is secured to the bar 116 by a stud bolt 203. Rotation of eccentric bushing 202 serves to move the sleeve 199, sleeve 194 and the type 198 carried thereby transversely of the machine in order to adjust the impression made by the type 198.

Sprocket 200 engages chain 118 for rotation thereby and in order to rotate sleeve 194 there is provided a friction washer 204 disposed on the upper surface of the sprocket 200 and engaging the lower surface of sleeve 193. In order to further increase the friction between sleeve 193 and washer 204, a weight in the form of a cap 205 is removably positioned on the upper surface or end of sleeve 194. A plurality of sleeves 194 with suitable type 198 inserted in the grooves 197 may be provided for different printing needs, it only being necessary to remove the cap 205 and the sleeve 194 with the type in the grooves 197 and substitute another sleeve in position for printing. This arrangement precludes the necessity for resetting the type each time it is desired to impress different information on the containers being sealed.

Since it is necessary to support the opposite side of the container from that engaged by the type 193 a backing roller 206 of wood or other suitable material is frictionally held on a sleeve 207 having a sprocket 208 at the lower end thereof. The sleeve 207 is rotatably supported by anti-friction bearings 209 on an eccentric bushing 210 which in turn is secured to the bar 117 by a stud bolt 211. Adjustment of the eccentric bushing 210 serves to move the backing roll 206 toward or from the containers passing through the machine and the backing roller 206 is rotated by engagement of the sprocket 208 with the chain 119.

The type 198 are supplied with ink by means of an inking roller shown generally at 212, this roller comprising a hub 213 rotatably mounted on a pin 214 secured to an arm 215 which in turn is pivotally mounted at 216 on bar 116. The hub 213 is provided with a finger-engaging knob 217 whereby the inking roller may be conveniently removed and replaced on the pin 214. Received about the circumference of the hub 213 is an inking pad 218 of sponge rubber, cellulose sponge or other suitable material which retains sufficient ink for many impressions. The position of the inking roll 212 with relation to the type 198 is controlled by an adjusting screw 219 threadedly received in an ear 220 on bar 116. There is also provided a finger-engaging knob 221 on the screw 219 in order to facilitate adjusting the same and the inking roller 212 is resiliently urged into engagement with the type 198 by a coil spring 222 received about the adjusting screw 219 and engaging the arm 215 on which the inking roller 212 is rotatably mounted.

The type cylinder 193 is intended to make one revolution for each container to be printed and the mechanism for controlling this one revolution is best shown in Figs. 3 and 6. The collar 195 mounted on the sleeve 194 is provided with an upstanding pin 223 which, when in the position shown in Fig. 6, is engaged by a hook 224 forming part of an arm 225 of the armature 226 of a solenoid 227. The arm 225 and hook 224 are held in the position shown in full lines in Fig. 6 by a tension spring 228. With the hook 224 engaging the pin 223, as shown in full lines in Fig. 6, the sleeve 193 and type 198 carried thereby are stationary but due to the frictional engagement through washer 204 with sprocket 200, the sleeve 199 and sprocket 200 continue to rotate by reason of the engagement of sprocket 200 with chain 116. Upon movement of the hook 224 and arm 225 to the position shown in dotted lines in Fig. 6, the printing cylinder 193 is permitted to revolve through the frictional engagement between sleeve 194, washer 204 and sprocket 200.

The operation of solenoid 227 and arm 225 which carries hook 224 is controlled by a switch 229 adjustably secured on a rod 230 by a thumb screw 231. The switch 229 is provided with a trigger 232 which projects into the path of movement of containers passing through the machine after they have contacted the sealing rolls 64 and 65, actuation of the switch 229 by such contact with the trigger 232 serving to energize the solenoid 227 and move the arm 225 and hook 224 into the dotted line position, as shown in Fig. 6. Immediately upon the container passing the trigger 232, the same is released to open the circuit to solenoid 227 and the arm 225 and hook 224 return to the full-line position, as shown in Fig. 6, and contacts pin 223 to stop rotation of the sleeve 194 and type 195 carried thereby after completing one revolution. In the event an extremely wide bag or container or a strip of material are fed through the machine, the printing cylinder 193 will continue to rotate until the trigger 232 is released opening the circuit to the solenoid 227.

Since there will be times when it is not desired to utilize the printing mechanism, there is provided an "on-off" switch 233 connected in the solenoid control circuit whereby with this switch in the "off" position, the solenoid 227 will not be energized upon actuation of the trigger 232 and, consequently, the type cylinder 193 will remain at rest. When it is desired to utilize the printing mechanism, it is only necessary to move the switch 233 to "on" position, at which time the printing mechanism will operate as described above.

It is also proposed to provide a punching mechanism for punching an aperture in the sealed portion of the container, which punching mechanism may be substituted for the printing mechanism above described. Also to be later described is a combined punching mechanism and printing mechanism which may be supplied with the machine described above. In order to provide for convenient interchangeability, the bars 116 and 117 which are connected at their outer ends by yoke 136 are also connected at their inner ends by integral frame member 234 which may be secured to the lower frame member 43 of the sealing mechanism by screw-threaded fastening means or the like 235. Fastening means 235 serve to receive elongated slots 236 in the frame member 234 and adjusting screws 237 are threaded through the vertical portion of the frame 234 and engage the frame of the sealing apparatus to properly adjust the frame 234 and bars 116 and 117 with relation to the frame in order to provide proper tension in chains 118 and 119.

The punching mechanism comprises a casting 239 extending transversely of the machine and pivotally mounted on a stud 240 extending from the bar 116. The casting 239 is provided with a vertically disposed transverse slot 241 located in the path of the movement of the container being sealed. The casting 239 is also provided with an aperture 242 extending at substantially right angles to the slot 241 and intersecting the same. In the aperture 242 is slidably disposed a punch 243 which may be of circular or any other desired formation. Punch 243 is provided at its outer end with a head 244 and between this head and the casting 239 is disposed a compression spring 245 which normally retains the punch in retracted position, as shown in Fig. 16. Aligned with the aperture 242 at the opposite side of the slot 241 is another aperture 246 which provides for convenient removal of the punchings from the material of the container. Ears 247 extend from casting 239 and serve to pivotally support a rocker arm 248 having a rounded end 249 for contacting the head 244 on punch 243, the opposite end of arm 248 being engaged by a stud bolt 250 threadedly received in a block 251 and locked in adjusted position by a lock nut 252. Block 251 is secured to the armature 253 of a solenoid 254 also mounted on the casting 239. The armature 253 is provided with a cross-bar 255 which slides between guides 256 and serves to limit reciprocating movement of the solenoid armature 253 and the block 251.

As will be seen from an inspection of Figs. 16 and 17, movement of the solenoid armature 253 toward the left will actuate the rocker arm 248 to move the punch 243 inwardly and punch an aperture in the sealed mouth 257 of the container 19, the mouth 257 being disposed in the slot 241 in the casting 239. Movement of the solenoid armature 253 toward the right, as viewed in Figs. 16 and 17, will result in retraction of the punch 243 by means of the compression spring 245. Entry of the bag mouth 257 into the slot 241 is facilitated by curved surfaces 258 formed on ears 259 projecting from the casting 239 at the right-hand side thereof, as viewed in Fig. 15.

Since the containers 19 are in motion during the time that the punch 243 is operating, it becomes necessary for the complete punch assembly to move with such containers in order to prevent tearing of the material of the container adjacent the aperture provided by the punch 243. This is accomplished much in the manner of the well-known flying shear. In this instance the casting 239 is permitted to pivot about the stud 240 and since, as shown in Fig. 15, the punching mechanism is disposed transversely of the direction of travel of the containers 19 immediately upon the punch 243 engaging the mouth portion 257 of the containers 19, the punch pivot in a counter-clockwise direction, as viewed in Fig. 15, thereby traveling with the moving container until the punch 243 is retracted from the material of the container 19. After completion of the punching operation and withdrawal of the punch 243, the casting 239 is returned to its original position by resilient means such as a spring 260 attached thereto, the position of the punch, when inoperative, being determined by a stop 261 adjustably secured on a rod 262 by a set screw or the like 263.

The operation of the solenoid 254 is controlled by a switch 264 adjustably secured on a rod 265 by a thumb screw 269. Switch 264 is provided with a trigger 270 which projects into the path of movement of the mouth 257 of the container 19 and upon contact with the trigger 270 operates the switch 264 to energize the solenoid 254. Solenoid 254 receives its electrical energy from a relay 271, the operation of which is controlled by means of switch 264 from a dry disc-type rectifier 272. The operation of the rectifier and relay in the electrical circuit will be later described.

In order to render the punching means inoperative, there is provided an "off-on" switch 273 which, when in the "off" position, prevents the flow of electrical energy to the solenoid 254 even though the switch 264 may be actuated and when in the "on" position, the solenoid and punch operate as described above.

If desired, the printing mechanism and punch may be combined into one unit to be applied to the basic sealing machine and the structure of this combined unit is best shown in Fig. 18. This unit comprises bars 274 and 275 which are similar to bars 116 and 117 although considerably longer and are connected by yokes 276 and 277, there being an upstanding frame 278 at the opposite ends of the bars 274 and 275. Frame 278 is provided with elongated slots 279 which receive the bolts 235 on the sealing machine and serve to clamp the unit in place.

When using the combined printing and punching unit, the chains 118 and 119 are considerably longer and these are driven from sprockets on shafts 280 and 281 which are provided with meshing spur gears 282 and 283 respectively. Also provided on shaft 281 is a sprocket 284 which receives chain 285 trained over a sprocket on shaft 134. Shaft 134 is driven by sprocket 139 and chain 140.

When it is desired to use the combined printing and punching mechanism it is only necessary to remove either the punching or the printing mechanism, depending on which is in service, and substitute the combined mechanism therefor at the same time attaching the elongated chains 118 and 119. This mechanism, together with the basic sealing machine, provides in one apparatus an efficient sealing mechanism, means for printing information such as dates, etc. on sealed containers; and means for punching an aperture in the container to facilitate supporting the same from a display stand or the like. Obviously, this mechanism may be attached to the basic sealing machine without in any way altering the same.

With some types of thermoplastic materials it is necessary to retain the sealed portions in tight engagement for the period of time after being subjected to the action of heat and pressure and for use with these materials there has been provided a unit which may be attached to the basic sealing machine much in the manner of the combined printing and punching unit above described. This may be termed "a compressing and cooling unit" and comprises bars 286 and 287, which are similar to bars 274 and 275 of the combined printing and punching unit, bars 286 and 287 being connected by yokes 288 and 289 at one end thereof and by upstanding frame 290 at the opposite end. Frame 290 is provided with elongated slots 291 for receiving bolts 235 for securing the unit to the sealing machine. The compressing and cooling unit is best shown in Figs. 19 and 20 and includes a pair of opposed V-belts 292 and 293 trained over pulleys 294 and 295 respectively, these pulleys being carried by ecentric mountings 296 and 297 in order to provide proper tension in the belts. The opposite ends of belts 292 and 293 are trained over pulleys 298 and 299 mounted on shafts 135 and 134 respectively, these shafts and pulleys being driven by sprocket 134 and chain 140.

In order to maintain the belts 292 and 293 in tight engagement with the sealed mouth portions 257 of the containers 19 being carried through the machine, there may be provided backing plates or shoes 300 and 301, which are slidably supported by pins 302 fixed to ears 303 extending from the bars 286 and 287. The shoes 300 and 301 are held in engagement with the belts by compression springs 304 received about the pins 302. An additional pair of belts 305 and 306 are disposed directly below belts 292 and 293 and the latter belts are trained around pulleys 307 and 308 mounted on shafts 135 and 134, respectively.

In operation, as the sealed containers pass from between the sealing rolls they are carried between the belts 292, 293, 305 and 306 and because of the pressure exerted on these belts by the shoes 300 and 301, the sealed openings of the containers are held in tight engagement for an appreciable period of time to cool and set the seal of such containers. This provides for the required cooling and pressing time with certain types of materials and results in a seal which does not become separated at a later date.

The electrical circuit for supplying power and controlling the operation of the sealing apparatus of this invention is schematically shown in Fig. 21 and includes power supply leads 309 and 310. Power supply lead 310 is provided with a branch lead 311 which connects to drive motor 30 and lead 310 also connects to motor pilot light 192. Power supply lead 309 is connected to one contact of motor switch 189 and the opposite contact 312 is connected to lead 313 to the motor 30. Closing of switch 189 energizes the motor 30 and sets the apparatus in operation and at the same time motor pilot light 192 is illuminated to indicate that power is being supplied to the drive motor.

From power supply lead 309 a wire 314 leads to one contact 315 of preheater switch 190, the opposite contact of this switch extending through a lead 316 to one contact of thermostat 171. The opposite contact 317 of thermostat 171 is connected through wire 318 to preheating elements 168 and 170. Contact 317 of thermostat 171 is also connected through wire 319 to the preheater pilot light 192. Power supply lead 310 connects through wire 320 with preheater pilot light 192 and also through wire 321 with the opposite side of the preheater coil 168 and 170. It will thus be seen that operation of thermostat 171 serves to open and close the circuit to preheating coils 168 and 170 thus supplying energy thereto in accordance with the temperature setting of the thermostat 171. Operation of the thermostat to open and close the circuit to the coils 168 and 170 also opens and closes the circuit to preheater pilot light 192, thus giving visual indication as to when the preheating coils are energized or de-energized.

Power supply lead 309 is connected through wires 314 and 322 to one contact 323 of a normally open relay 324. Wire 322 is also connected to one side of the coil 325 forming the solenoid of relay 324 and when energized serves to actuate the movable contact 326 to closed position. The other contact 327 of relay 324 is connected by a wire 328 to one movable contact of a double pole double throw switch 191.

The heating element 89 in the front sealing roll 64 is provided with electrical energy from the slip rings 95, 96 and 97 mounted on shaft 44, slip ring 95 being connected to one side of the heating element 89 through a conductor 330, the opposite side of the heating element 89 being connected through a wire 331 with the slip ring 96. The thermostat 100 disposed in the front roll 64 has one contact 332 connected to the wire 331 and the opposite contact 333 connected by a wire 334 with the slip ring 97.

The heating element 67 disposed in the rear sealing roll 65 is provided with electrical energy from the slip rings 81 and 82 mounted on shaft 45, one side of the element 67 being connected by a wire 335 with slip ring 81 and the opposite side of the element 67 being connected with slip ring 82 by a wire 336. Slip rings 95, 96 and 97 are contacted by brushes 176, 177 and 178 respectively, while slip rings 81 and 82 are contacted by brushes 174 and 175 respectively. The second movable contact 337 on the double pole double throw switch 191 is connected through a wire 338 with the brush 177 engaging slip rings 96 and through a wire 339 with the roll pilot light 192 and through wire 340 and wire 320 with the supply lead 310. Contact 341 of switch 191 is connected by a wire 342 with contact 343 which in turn is connected by a wire 344 with brush 174 engaging slip ring 81. Contact 345 of switch 179 is connected through wire 346 with roll pilot light 192, through wire 347 with brush 175 in contact with slip ring 82 and through wire 348 with brush 176 in contact with slip ring 95. No connection is made to contact 349 of the switch 191 and this contact plays no part in the control or operation of the apparatus. Brush 178 in contact with slip ring 97 is connected by a wire 350 with the coil 325 of relay 324. In order to prevent excessive arcing between the contacts 332 and 333 of thermostat 100, a .1 mfd. condenser 351 is connected across the brushes 177 and 178 in contact with slip rings 96 and 97 which in turn are connected across the contacts 332 and 333 of the thermostat 100. This condenser materially increases the life of the thermostat contact points.

Assuming the sealing machine of this invention to be at rest and the heating elements 89 and 67 in the rolls 64 and 65 to be cold, the operation of the electrical supply and control circuit thus far described is as follows: Current is supplied through lead 309 and 310 and the motor 30 may be turned "on" or "off" at will by operation of the motor control switch 189. Current will further flow from lead 309 through wire 314 and wire 322 through the coil 325 of solenoid 324 to actuate the movable contact 326, thus closing the contacts 323 and 327, since the complete circuit of the coil 325 will be through conductor 350 to brush 178 engaging slip ring 97 through conductor 324 to the contact 333 of thermostat 100 and since in the cold condition of the heating elements the thermostat will be closed, current will flow through contact 332, wire 331, slip ring 96, brush 177 and wires 338, 339, 340 and 320 to the opposite supply lead 310.

Assuming the double pole double throw switch 191 to be in the high or upper position, as shown in Fig. 21, current will flow from contact 327 of relay 324 through wires 328 to movable contact 329 of the switch 191 and through contact 345 and wire 347 to brush 175 in contact with slip ring 82, and through wire 348 to brush 176 in contact with slip ring 95. Contact 345 also connects through wire 346 with the roll pilot light 192 and will serve to energize the same with the switch in the position above described. Energy will flow from the slip ring 95 through wire 330 to heating element 89 and the return circuit through wire 331, through slip ring 96, brush 177 in contact therewith and wire 338 which connects to the supply lead 310. The circuit for heating element 67 is from slip ring 82 through wire 336 and return through wire 335 to slip ring 81, brush 174 and wire 344, contact 343 of the switch 191, which, when in high position, connects movable contacts 337 with contacts 343, and thus through wire 339 connects with the opposite side of the supply lead 310.

With the switch 191 in the above-described position the heating elements 67 and 89 will continue to supply heat until the temperature of the rolls 64 and 65 reaches the point at which the thermostat 100 is set at which time the contacts 332 and 333 will separate, thus de-energizing the coil 325 of relay 324 and opening the contacts 323 and 327 to interrupt the flow of current to the heating elements 67 and 89.

With the double pole double throw switch 191 in the regular or lower position, as shown in Fig. 21, current will flow from contact 327 through wire 328 to the movable contact 329 of the switch 191, thence through contact 341, wire 342 and wire 344 to brush 174 which engages slip ring 81, thence through conductor 335 to the heating elements 67 and through conductor 336 to the slip ring 82 and brush 175 in engagement therewith. From brush 175 electrical energy flows through wire 348 to brush 176 in contact with slip ring 95 and through wire 330 to heating element 89, the return circuit being through wire 331 to slip ring 96 and brush 177 and through wire 338 to the opposite supply lead 310. This position of the switch 191 places the heating elements 67 and 89 in series thus resulting in a lower wattage consumption and, consequently, lower potential heat in the rolls 64 and 65. As before, the temperature will be controlled by opening and closing of the thermostat 100 which controls operation of the relay 324 and thus the supply of current to the heating elements. The electrical supply and control system above described is relatively simple and adequately controls the operation of the sealing machine of this invention.

The control circuit for the printing apparatus receives energy from supply lead 309 through wire 314 which connects to one contact 352 of the switch 229 which is normally open. The opposite contact 353 of switch 229 connects through a wire 354 with the coil of the solenoid 227. The opposite side of the coil of the solenoid 227 connects to one contact 355 of "on—off" switch 233, the opposite side of this switch connecting through a lead 356 and a wire 357 with the opposite power supply lead 310. Closing of the switch 233 and the switch 229 operates to energize the solenoid 227 and operate the printing apparatus, as described above. The switch 229 is actuated by contact with a container passing through the apparatus.

The punch control circuit receives its energy from power supply lead 310 through wire 357 and "on—off" switch 273, the switch 273 being connected through a wire 358 with one side of the solenoid 254 which actuates the punch. The opposite side of solenoid 254 connects through a wire 359 with one contact 360 of the normally open relay 271. The opposite contact 361 of relay 271 connects through a wire 362 with one contact 363 of the single pole double throw switch 264 and contact 361 also connects through a wire 364 with wire 314 and power supply lead 309. The solenoid 365 which operates movable contact 366 of relay 271 is connected through a 10 mfd. condenser 367 with the movable contact 368 of switch 264. The opposite side of the solenoid 365 connects through a wire 369 with the contact 370 of switch 264. The "on—off" switch 273 is also connected through a dry disc-type rectifier 272 and a 1000 ohm dropping resistor with the solenoid 365 and the condenser 367.

In operation with the "on—off" switch 273 in closed position and with the contacts 368 and 363 of switch 264 closed the solenoid 365 of relay 271 will be de-energized and the movable contact 366 will be retracted, thus opening the circuit between contacts 360 and 361. Current, however, will flow through rectifier 272, condenser 367, contacts 368 and 363 of switch 264 and through wire 362 and wire 364 to the supply lead 309. Rectifier 272 will convert this alternating current to direct current and charge the condenser 367. Upon passage of a sealed container through the apparatus and contact with the trigger 270 of switch 264, the contact 368 will be moved from contact 363 to contact 370, thus discharging the condenser 367 through solenoid 365 of relay 271 momentarily energizing the same and actuating the movable contact 366 to close the contacts 360 and 361 and thus energizing the solenoid 254 to actuate the punch. Upon release of the trigger 270 by passage of the container the contact 368 will move back into contact with the contact 363 and recharge the condenser 367 in preparation for the next cycle of operation. This circuit results in momentary actuation of the punching mechanism and precludes the necessity of supplying switching means to turn the solenoid 365 of the relay "on" and "off," since this operation is performed by charging and discharging the condenser 367. Automatic control of the punch system is thus provided and the same may be rendered operative or inoperative by actuation of the "on" or "off" switch 273.

It will be seen that by the above invention there has been provided a relatively simple, yet compact and highly efficient sealing apparatus in which thermoplastic containers may be automatically fed into the sealing machine, at which time the open mouths of the containers are folded and passed between preheating means which supplies the necessary heat to soften the thermoplastic material after which the containers pass between the sealing rolls which are heated to the desired temperature, these rolls supplying the necessary heat and pressure to effect the seal. If the material is of the type which requires additional pressure after being subjected to the action of the sealing rolls, the apparatus contemplates the provision of pressing and cooling means, as described above, which will effect such a complete seal.

Also, as stated above, means is conveniently provided to imprint a date or other information on the sealed container and this is actuated by contact of the container itself passing through the machine with the trigger of a switch which sets in motion the printing apparatus after which the printing is automatically completed. Where it is also desired to provide an aperture in the container to facilitate supporting the same on a display rack or the like, a punching means is provided which is also automatically actuated by the contact of the container with the trigger of a switch, at which time a solenoid actuated punch is operated to punch a hole in the container and, as described above during the punching operation, the punch moves with the container in order to preclude any tearing of the material thereof. The operation of the printing mechanism and punching mechanism is entirely automatic and either or both of these mechanisms may be rendered operative or inoperative at will merely by actuating the proper switches.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A sealing, printing and punching machine for thermoplastic containers comprising in combination a base, a frame attached to said base, spaced substantially parallel vertically disposed shafts rotatably mounted on said frame, variable speed drive means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed chains driven by said drive means in synchronism with said rolls, said containers being received between said chains to feed the same through said machine, an annular groove adjacent the lower peripheral edge of each roll for receiving said chain adjacent the point of tangency of said roll, preheating means in advance of said rolls for heating a portion of said containers prior to contact with said rolls, printing means disposed in the path of feeding movement of said containers after leaving said rolls for printing information on the sealed portion and punching means disposed in the path of feeding movement of said containers after leaving said printing means for punching an aperture in the sealed portion of said container.

2. A sealing, printing and punching machine for thermoplastic containers comprising in combination a base, a frame attached to said base, spaced substantially parallel vertically disposed shafts rotatably mounted on said frame, means for driving said shafts, front and rear sealing rolls fixed to said shaft, adjustable yieldable means biasing said front roll toward said rear roll, heating elements in said rolls, an adjustable thermostat controlling said heating elements, feeding means for containers to be sealed comprising chains driven by said driving means in synchronism with said rolls, said containers being received between said chains to feed the same through said machine, an annular groove adjacent the lower peripheral edge of each roll for receiving said chains adjacent the point of tangency of said rolls, printing means disposed in the path of feeding movement of said containers after leaving said rolls for printing information on the sealed portion thereof and punch means disposed in the path of feeding movement of said containers after leaving said printing means for punching an aperture in the sealed portion of said container.

3. A sealing, printing and punching machine for thermoplastic containers comprising in combination a base, a frame attached to said base, spaced substantially parallel vertically disposed shafts rotatably mounted on said frame, means for driving said shafts, front and rear sealing rolls fixed on said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls, printing means disposed in the path of feeding movement of said containers after leaving said rolls for printing information on the sealed portion thereof and punch means disposed in the path of feeding movement of said containers after leaving said printing means for punching an aperture in the sealed portion of said container.

4. A sealing and printing machine for thermoplastic containers comprising in combination a base, a frame attached to said base, spaced substantially parallel vertically disposed shafts rotatably mounted on said frame, variable speed drive means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising chains driven by said drive means in synchronism with said rolls, said containers being received between said chains to feed the same through said machine, an annular groove adjacent the lower peripheral edge of each roll for receiving said chains adjacent the point of tangency of said rolls, preheating means in advance of said rolls for heating a portion of said containers prior to contact with said rolls and printing means disposed in the path of feeding movement of said containers after leaving said rolls for printing information on the sealed portion thereof.

5. A sealing and printing machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls, preheating means in advance of said rolls for heating a portion of said containers prior to the contact with said rolls and printing means disposed in the path of feeding movement of said containers after leaving said rolls for printing information on the sealed portion thereof.

6. A sealing and printing machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls and printing means disposed in the path of feeding movement of said containers after leaving said rolls for printing information on the sealed portion thereof.

7. A sealing and punching machine for thermoplastic containers comprising in combination a base, a frame attached to said base, spaced substantially parallel vertically disposed shafts rotatably mounted on said frame, variable speed means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed chains driven by said drive means in synchronism with said rolls, said containers being received between said chains to feed the same through said machine, an annular groove adjacent the lower peripheral edge of each roll for receiving said chains adjacent the point of tangency of said rolls, preheating means in advance of said rolls for heating a portion of said containers and punch means disposed in the path of feeding movement of said containers after leaving said rolls for punching an aperture in the sealed portion of said containers.

8. A sealing and punching machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls, preheating means in advance of said rolls for heating a portion of said containers prior to contact with said rolls and punch means disposed in the path of feeding movement of said containers after leaving said rolls for punching an aperture in the sealed portion thereof.

9. A sealing and punching machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising flexible means driven by said drive means in synchronism with said rolls, said containers being received between said flexible means to feed the same through said machine, an annular groove adjacent the lower peripheral edge of each roll for receiving said flexible means adjacent the point of tangency of said rolls and punch means disposed in the path of feeding movement of said containers after leaving said rolls for punching an aperture in the sealed portion of said containers.

10. A sealing and punching machine for thermoplastic containers comprising in combination a base, a frame attached to said base, spaced substantially parallel vertically disposed shafts rotatably mounted on said frame, variable speed means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed chains driven by said drive means in synchronism with said rolls, said containers being received between said chains to feed the same through said machine, an annular groove adjacent the lower peripheral edge of each roll for receiving said flexible chains adjacent the point of tangency of said rolls, preheating means in advance of said rolls for heating a portion of said containers prior to contact with said rolls, pressing and cooling means disposed in the path of feeding movement of said containers after leaving said rolls to compress and cool the sealed portion of said containers and punch means disposed in the path of feeding movement of said containers after leaving said pressing and cooling means for punching an aperture in the sealed portion of said containers.

11. A sealing and punching machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls, preheating means in advance of said rolls for heating a portion of said containers prior to contact with said rolls, pressing and cooling means disposed in the path of feeding movement of said containers after leaving said rolls to compress and cool the sealed portion of said containers and punch means disposed in the path of feeding movement of said containers after leaving said pressing and cooling means for punching an aperture in the sealed portion of said containers.

12. A sealing and punching machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls, pressing and cooling means disposed in the path of feeding movement of said containers after leaving said rolls to compress and cool the sealed portion of said containers and punch means disposed in the path of feeding movement of said containers after leaving said pressing and cooling means for punching an aperture in a sealed portion of said containers.

13. A sealing machine for thermoplastic containers comprising in combination a base, a frame attached to said base, spaced substantially parallel vertically disposed shafts rotatably mounted on said frame, variable speed means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed chains driven by said drive means in synchronism with said rolls, said containers being received between said chains to feed the same through said machine, an annular groove adjacent the lower peripheral edge of each roll for receiving said chains adjacent the point of tangency of said rolls, preheating means in advance of said rolls for heating a portion of said containers and pressing and cooling means disposed in the path of feeding movement of said containers after leaving said rolls to compress and cool the sealed portion of said containers.

14. A sealing machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls, preheating means in advance of said rolls for heating a portion of said containers prior to contrast with said rolls and pressing and cooling means disposed in the path of feeding movement of said containers after leaving said rolls to compress and cool the sealed portion of said containers.

15. A sealing machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat controlling said heating elements, feeding means for containers to be sealed comprising opposed flexible means driven by said drive means in synchronism with said rolls, said containers being received between said flexible means to feed the same through said machine, an annular groove adjacent the lower peripheral edge of each roll for receiving said flexible means adjacent the point of tangency of said rolls and pressing and cooling means disposed in the path of feeding movement of said containers after leaving said rolls to compress and cool the sealed portion of said containers.

16. A sealing machine for the thermoplastic containers comprising in combination a base, a frame attached to said base, spaced substantially parallel vertically disposed shafts rotatably mounted on said frame, variable speed means for driving said shafts, front and rear sealing rolls fixed to said shafts, adjustable yieldable means biasing said front roll toward said rear roll, heating elements in said rolls, an adjustable thermostat controlling said heating elements, feeding means for containers to be sealed comprising opposed chains driven by said drive means in synchronism with said rolls, said containers being received between said chains to feed the same through said machine, an annular groove adjacent the lower peripheral edge of each roll for receiving said chains adjacent the point of tangency of said rolls and preheating means in advance of said rolls for heating a portion of said containers prior to contact with said rolls.

17. A sealing machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat controlling said heating elements, feeding means for containers to be sealed comprising opposed flexible means driven by said drive means in synchronism with said rolls, said containers being received between said chains to feed the same through said machine, an annular groove adjacent the lower peripheral edge of each roll for receiving said flexible means adjacent the point of tangency of said rolls and preheating means in advance of said rolls for heating a portion of said containers prior to contact with said rolls.

18. A sealing machine for thermoplastic containers comprising in combination a base, a frame attached to said base, spaced substantially parallel vertically disposed shafts rotatably mounted on said frame, means for driving said shafts, front and rear sealing rolls fixed to said shafts, adjustable yieldable means biasing said front roll toward said rear roll, heating elements in said rolls, an adjustable thermostat for controlling said heating elements, feeding means for containers to be sealed comprising opposed flexible means driven by said drive means in synchronism with said rolls, said containers being received between said flexible means to feed the same through said machine and an annular groove adjacent the lower peripheral edge of each roll for receiving said flexible means adjacent the point of tangency of said rolls.

19. A sealing and printing machine, as defined in claim 6, in which said printing means comprises a printing cylinder rotatably mounted on said frame, means on said cylinder for removably receiving type means for adjusting the position of said cylinder relative to containers passing through said machine, friction drive means for said cylinder, said drive means being driven by said feeding means in synchronism therewith, an inking roll for contact with said type, said inking roll having an ink-carrying pad of sponge-like material, means for adjusting the position of said inking roll relative to said printing cylinder, a rotatable backing roll spaced from and in opposition to said printing cylinder and driven by said feed means in synchronism therewith, means for adjusting the position of said backing roll relative to said printing cylinder and means for permitting one revolution of said printing cylinder for each printing operation comprising a solenoid having an armature, a hook on said armature, a projection on said printing cylinder, said hook-engaging said projection when said solenoid is deenergized to prevent rotation of said printing cylinder, a normally open switch connected in the electrical supply circuit for said solenoid, a trigger extending from said switch into the path of feeding movement of containers passing through said machine, whereby upon closing of said switch by engagement of a container with said trigger said solenoid will be energized to release said hook from said projection and permit said printing cylinder to revolve and impress an image of said type on said container and upon disengagement of said container from said trigger said solenoid will be de-energized to return said hook into the path of movement of said projection to stop the rotation of said printing cylinder.

20. A sealing and printing machine as defined in claim 6 in which said printing means comprises a printing cylinder rotatably mounted on said frame, means on said cylinder for removably receiving type, friction drive means for said cylinder, said drive means being driven by said feeding means in synchronism therewith, an inking roll for contact with said type, said inking roll having an ink-carrying pad of sponge-like material, backing means spaced from and in opposition to said printing cylinder, means for adjusting the position of said backing means relative to said printing cylinder and means for permitting one revolution of said printing cylinder for each printing operation comprising a solenoid having an armature, a hook on said armature, a projection on said printing cylinder, said hook-engaging said projection when said solenoid is de-energized to prevent rotation of said printing cylinder, a normally open switch connected in the electrical supply circuit for said solenoid, a trigger extending from said switch into the path of feeding movement of containers passing through said machine, whereby upon closing of said switch by engagement of a container with said trigger said solenoid will be energized to release said hook from said projection and permit said printing cylinder to revolve and impress an image of said type on said container and upon disengagement of said container from said trigger said solenoid will be de-energized to return said hook into the path of movement of said projection to stop the rotation of said printing cylinder.

21. A sealing and printing machine as defined in claim 6 in which means comprises a printing cylinder rotatably mounted on said frame, means on said cylinder for removably receiving type, friction drive means for said cylinder, an inking roll for contact with said type, said inking roll having an ink-carrying pad, backing means spaced from and in opposition to said printing cylinder and means for permitting one revolution of said printing cylinder for each printing operation comprising a solenoid having an armature, a hook on said armature, a projection on said printing cylinder, said hook engaging said projection when said solenoid is de-energized to prevent rotation of said printing cylinder, a normally open switch connected in the electrical supply circuit for said solenoid, a trigger extending from said switch into the path of feeding movement of containers passing through said machine, whereby upon closing of said switch by engagement of a container with said trigger said solenoid will be energized to release said hook from said projection and permit said printing cylinder to revolve and impress an image of said type on said container and upon disengagement of said container from said trigger said solenoid will be de-energized to return said hook into the path of movement of said projection to stop the rotation of said printing cylinder.

22. A sealing and printing machine as defined in claim 6 in which said printing means comprises a printing cylinder rotatably mounted on said frame, means on said cylinder for removably receiving type, friction drive means for said cylinder, an inking roll for contact with said type, said inking roll having an ink-carrying pad, backing means spaced from and in opposition to said printing cylinder, and means for permitting one revolution of said printing cylinder for each printing operation comprising a solenoid having an armature, a hook on said armature engaging a portion of said printing cylinder when said solenoid is deenergized to prevent rotation of said printing cylinder, a normally open switch connected in the electrical supply circuit for said solenoid, a trigger extending from said switch into the path of feeding movement of containers passing through said machine, whereby upon closing of said switch by engagement of a container with said trigger said solenoid will be energized to release said hook from said printing cylinder and permit said printing cylinder to revolve and impress an image of said type upon said container and upon disengagement of said container from said trigger said solenoid will be de-energized to return said hook into the path of movement of said portion to stop the rotation of said printing cylinder.

23. A sealing and printing machine as defined in claim 22 in which said switch is adjustably mounted for movement longitudinally of the machine whereby said printing mechanism may be adjusted to accommodate containers of different sizes.

24. A sealing and punching machine as defined in claim 9 in which said punch means comprises a member pivotally mounted on said machine and extending transversely of the path of feeding movement of said containers, a slot in said member for receiving the sealed portion of a container, a punch slidably mounted in said member and operable to perforate the sealed portion of a container disposed in said slot, a rocker arm pivotally mounted on said member with one end disposed for engagement with said punch, a solenoid having an armature engageable with the opposite end of said rocker arm to actuate said punch, the pivotal mounting of said member permitting movement thereof with the container during a punching operation to preclude tearing of the container, resilient means to return said member to original position after completion of a punching operation, an actuating and control circuit for said solenoid comprising a source of electrical energy, a normally open relay connected between said source and said solenoid, a rectifier and condenser connected to the coil of said relay, a single pole double throw switch connected to said condenser and coil, two of the contacts of said switch being normally closed to charge said condenser, a trigger on said switch disposed in the path of feeding movement of containers passing through said machine, whereby upon engagement of a container with said trigger the normally open contacts of said switch will be closed to discharge said condenser through the coil of said relay to momentarily close the contacts thereof and energize said solenoid and upon disengagement of said container from said trigger the other contacts of said switch will be closed to recharge said condenser.

25. A sealing and punching machine as defined in claim 9 in which said punch means comprises a member pivotally mounted on said machine and extending transversely of the path of feeding movement of said containers, a slot in said member for receiving the sealed portion of the container, a punch slidably mounted in said member and operable to perforate the sealed portion of a container disposed in said slot, a solenoid for actuating said punch, the pivotal mounting of said member permitting movement thereof with the container during a punching operation to preclude tearing of the container, resilient means to return said member to original position after completion of the punching operation, an actuating and control circuit for said solenoid comprising a source of electrical energy, a normally open relay connected between said source and said solenoid, a rectifier and condenser connected to the coil of said relay, a single pole double throw switch connected to said condenser and coil, two of the contacts of said switch being normally closed to charge said condenser, a trigger on said switch disposed in the path of feeding movement of containers passing through said machine whereby upon engagement of a container with said trigger the normally open contacts of said switch will be closed to discharge said condenser through the coil of said relay to momentarily close the contacts thereof and energize said solenoid and upon disengagement of said container from said trigger the other contacts of said switch will be closed to recharge said condenser 26. A sealing and punching machine as defined in claim 9 in which said punch means comprises a member pivotally mounted on said machine and extending transversely of the path of feeding movement of said containers, a slot in said member for receiving the sealed portion of a container, a punch slidably mounted in said member and operable to perforate the sealed portion of a container disposed in said slot, a solenoid for actuating said punch, the pivotal mounting of said member permitting movement thereof with the container during a punching operation to preclude tearing of the container, resilient means to return said member to original position after completion of a punching operation, an actuating and control circuit for said solenoid comprising a source of electrical energy, a normally open relay connected between said source and said solenoid, a rectifier and condenser connected to the coil of said relay, a switch connected to said condenser and coil, two of the contacts of said switch being normally closed to charge said condenser, a trigger on said switch disposed in the path of feeding movement of containers passing through said machine, whereby upon engagement of a container with said trigger said switch will be actuated to discharge said condenser through the coil of said relay to momentarily close the contacts thereof and energize said solenoid and upon disengagement of said container from said trigger said switch will be closed to recharge said condenser.

27. A sealing and punching machine as defined in claim 9 in which said punch means comprises a member pivotally mounted on said machine and extending transversely of the path of feeding movement of said container, a slot in said member for receiving the sealed portion of a container, a punch slidably mounted in said member and operable to perforate the sealed portion of a container disposed in said slot, a solenoid for actuating said punch, the pivotal mounting of said member permitting movement thereof with the container during a punching operation to preclude tearing of the container, resilient means to return said member to original position after completion of the punching operation, an actuating and control circuit for said solenoid including a switch having a trigger disposed in the path of feeding movement of containers passing through said machine whereby upon engagement of a container with said trigger said solenoid will be momentarily energized to complete the punching operation.

28. A sealing machine as defined in claim 15 in which said pressing and cooling means comprises belts disposed in abutting relationship in the path of feeding movement of containers leaving said sealing rolls, backing shoes engaging said belts and resilient means engaging said backing shoes for urging said belts into contact with each other whereby the sealed portions of said container will be received between said belts and compressed during cooling and setting of the seal.

29. A sealing machine as defined in claim 15 in which said pressing and cooling means comprises flexible members disposed in abutting relationship in the path of feeding movement of containers leaving said sealing rolls, backing shoes engaging said flexible members and resilient means engaging said backing shoes for urging said flexible members into contact with each other whereby the sealed portion of said containers will be received between said flexible members and compressed during cooling and setting of the seal.

30. A sealing machine as defined in claim 15 in which said pressing and cooling means comprises flexible members disposed in abutting relationship in the path of feeding movement of containers leaving said sealing rolls and means for urging said flexible members into contact with each other whereby the sealed portions of said container will be received between said flexible members and compressed during cooling and setting of the seal.

31. In combination with a sealing machine for thermoplastic containers having a pair of opposed sealing rollers and means for driving said rollers, automatic container feeding means for said machine comprising a pair of arms mounted on said machine and extending outwardly therefrom at the level of said rollers on the inlet side thereof, a second pair of arms mounted on said machine and extending outwardly therefrom at the level of said rollers on the outlet side thereof, a sprocket on the outer end of each arm, a pair of endless chains each surrounding one roller and the sprockets at the outer ends of the corresponding arms, means on each roller adjacent the lower peripheral edge thereof for engaging and supporting each chain adjacent the point of tangency of said rollers, the inner flights of said chains being parallel and opposed and driven at the same speed toward said rollers by certain of said sprockets and means carried by said arms guiding the inner flights of said chains and maintaining an adjusted pressure between said inner chain flights.

32. In combination with a sealing machine for thermoplastic containers having a pair of opposed sealing rollers and means for driving said rollers, automatic container feeding means for said machine comprising a pair of arms mounted on said machine and extending outwardly therefrom at the level of said rollers on the inlet side thereof, a second pair of arms mounted on said machine and extending outwardly therefrom at the level of said rollers on the outlet side thereof, a sprocket on the outer end of each arm, a pair of endless chains each surrounding one roller and the sprockets at the outer ends of the corresponding arms, means on each roller adjacent the lower peripheral edge thereof for engaging and supporting each chain adjacent the point of tangency of said rollers, the inner flights of said chains being parallel and opposed and driven at the same speed toward said rollers by certain of said sprockets, means carried by said arms guiding the inner flights of said chains and maintaining an adjusted pressure between said inner chain flights and spring loaded chain tightening means carried by said arms and operatively engaged with said chains.

33. In combination with a sealing machine for thermoplastic containers having a pair of opposed sealing rollers and means for driving said rollers, automatic container feeding means for said machine comprising a pair of arms mounted on said machine and extending outwardly therefrom at the level of said rollers on the inlet side thereof, a second pair of arms mounted on said machine and extending outwardly therefrom at the level of said rollers on the outlet side thereof, a sprocket on the outer end of each arm, a pair of endless chains each surrounding one roller and the sprockets at the outer ends of the corresponding arms, means on each roller adjacent the lower peripheral edge thereof for engaging and supporting each chain adjacent the point of tangency of said rollers, the inner flights of said chains being parallel and opposed and driven at the same speed toward said rollers by certain of said sprockets, means carried by said arms guiding the inner flights of said chains and maintaining an adjusted pressure between said inner chain flights and an additional chain guide pulley carried by each arm and operatively engage with the corresponding chain.

34. In combination with a sealing machine for thermoplastic containers having a pair of opposed sealing rollers and means for driving said rollers, automatic container feeding means for said machine comprising a pair of arms mounted on said machine and extending outwardly therefrom at the level of said rollers, a sprocket on the outer end of each arm, a pair of endless chains each surrounding one roller and the sprocket at the outer end of the corresponding arm, means on each roller adjacent the lower peripheral edge thereof for engaging and supporting each chain adjacent the point of tangency of said rollers, the inner flights of said chains being parallel and opposed and driven at the same speed toward said rollers by said sprockets and means carried by said arms guiding the inner flights of said chains and maintaining an adjusted pressure between said inner chain flights.

35. In combination with a sealing machine for thermoplastic containers having a pair of opposed sealing rollers and means for driving said rollers, automatic container feeding means for said machine comprising a pair of arms mounted on said machine and extending outwardly therefrom at the level of said rollers, a sprocket on the outer end of each arm, a pair of endless chains, each surrounding one roller and the sprocket at the outer end of the corresponding arm, means on each roller adjacent the lower peripheral edge thereof for engaging and supporting each chain adjacent the point of tangency of said rollers, the inner flights of said chains being parallel and opposed and driven at the same speed toward said rollers by said sprockets, and means carried by said arms guiding the inner flights of said chains and maintaining an adjusted pressure between said inner chain flights and spring-loaded chain tightening means carried by said arms and operatively engaged with said chains.

36. In combination with a sealing machine for thermoplastic containers having a pair of opposed sealing rollers and means for driving said rollers, automatic container feeding means for said machine comprising a pair of arms mounted on said machine and extending outwardly therefrom at the level of said rollers, a sprocket on the outer end of each arm, a pair of endless chains, each surrounding one roller and the sprocket at the outer end of the corresponding arm, means on each roller adjacent the lower peripheral edge thereof for engaging and supporting each chain adjacent the point of tangency of said rollers, the inner flights of said chains being parallel and opposed and driven at the same speed toward said rollers by said sprockets, means carried by said arms guiding the inner flights of said chains and maintaining an adjusted pressure between said inner chain flights and an additional chain guide pulley carried by each arm and operatively engaged with the corresponding chain.

JOHN J. GREVICH.

REFERENCES CITED

The following references are of record in the file of this patent:

UNITED STATES PATENTS

| Number | Name | Date |
| --- | --- | --- |
| 2,200,971 | Sonneborn | May 14, 1940 |
| 2,350,703 | Ryan et al. | June 6, 1944 |

OTHER REFERENCES

Doughboy, published by the Doughboy Industries, Inc., New Richmond, Wisc.